United States Patent
Bala et al.

(10) Patent No.: US 12,526,743 B2
(45) Date of Patent: Jan. 13, 2026

(54) WTRU POWER SAVING ASSOCIATED WITH IDLE MODE

(71) Applicant: InterDigital Patent Holdings, Inc., Wilmington, DE (US)

(72) Inventors: Erdem Bala, East Meadow, NY (US); Moon-il Lee, Melville, NY (US); Janet A. Stern-Berkowitz, Little Neck, NY (US); Paul Marinier, Brossard (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 404 days.

(21) Appl. No.: 17/924,068

(22) PCT Filed: May 12, 2021

(86) PCT No.: PCT/US2021/031949
§ 371 (c)(1),
(2) Date: Nov. 8, 2022

(87) PCT Pub. No.: WO2021/231543
PCT Pub. Date: Nov. 18, 2021

(65) Prior Publication Data
US 2023/0189147 A1   Jun. 15, 2023

Related U.S. Application Data

(60) Provisional application No. 63/140,589, filed on Jan. 22, 2021, provisional application No. 63/136,328, (Continued)

(51) Int. Cl.
*H04W 52/02* (2009.01)
*H04W 68/02* (2009.01)

(52) U.S. Cl.
CPC ....... *H04W 52/0229* (2013.01); *H04W 68/02* (2013.01)

(58) Field of Classification Search
CPC ............ H04W 52/0229; H04W 68/02; H04W 68/005; H04W 68/025; H04W 52/0216; H04W 52/0219; Y02D 30/70
See application file for complete search history.

(56) References Cited

U.S. PATENT DOCUMENTS

2019/0090191 A1* 3/2019 Liu .................. H04W 4/08
2019/0373577 A1* 12/2019 Agiwal ............. H04W 48/12
(Continued)

FOREIGN PATENT DOCUMENTS

CN       110839214 A      2/2020
EP         3606197 A1     2/2020
WO   WO 2019/099661 A1    5/2019

OTHER PUBLICATIONS

3rd Generation Partnership Project (3GPP), "On Power Saving Using PDCCH Skipping", Convida Wireless, R1-1913144, 3GPP TSG-RAN WG1 #99, Reno, Nov. 2019, Reno, USA, 5 pages.
(Continued)

*Primary Examiner* — Ayaz R Sheikh
*Assistant Examiner* — Mang Boi Thawng
(74) *Attorney, Agent, or Firm* — Flaster Greenberg, P.C.

(57) ABSTRACT

Systems, methods, and instrumentalities are described herein for wireless transmit/receive unit (WTRU) power saving (e.g., for idle mode). A WTRU may determine a time window associated with one or more paging indicators. The WTRU may monitor for a paging indicator (e.g., a first paging indicator) in the time window. The WTRU may monitor for another paging indicator (e.g., a second paging indicator) in the time window. The WTRU may receive system information blocks (SIBs) if a wake up indication for the WTRU is received in a single paging indication and the paging indicator is the first paging indicator. The WTRU may monitor for a paging PDCCH at a monitoring occasion
(Continued)

of a PO in a paging frame if the second paging indicator is received and includes an indication for the WTRU to wake up.

13 Claims, 20 Drawing Sheets

Related U.S. Application Data filed on Jan. 12, 2021, provisional application No. 63/091,623, filed on Oct. 14, 2020, provisional application No. 63/025,055, filed on May 14, 2020.

(56) References Cited

U.S. PATENT DOCUMENTS

| | | | |
|---|---|---|---|
| 2020/0084717 A1 | 3/2020 | Hoglund et al. | |
| 2020/0107267 A1* | 4/2020 | Wu | H04W 76/28 |
| 2020/0187265 A1* | 6/2020 | Luo | H04J 13/10 |
| 2020/0404617 A1* | 12/2020 | Murray | H04W 16/28 |
| 2021/0297987 A1* | 9/2021 | Hwang | H04W 52/0235 |
| 2022/0046542 A1* | 2/2022 | Hwang | H04B 7/0613 |
| 2022/0078708 A1* | 3/2022 | Yang | H04W 52/0229 |
| 2022/0303898 A1* | 9/2022 | Hwang | H04W 52/0219 |
| 2023/0023422 A1* | 1/2023 | Beale | H04W 24/10 |
| 2023/0082719 A1* | 3/2023 | Rusek | H04B 7/088 |
| | | | 455/458 |

OTHER PUBLICATIONS

3rd Generation Partnership Project (3GPP), "Medium Access Control (MAC) protocol specification" (Release 16), 3GPP TS 38.321 V16.0.0, Mar. 2020, Valbonne, France, 141 pages.

3rd Generation Partnership Project (3GPP), "Multiplexing and channel coding" (Release 16), 3GPP TS 38.212 V16.1.0, Mar. 2020, Valbonne, France, 146 pages.

3rd Generation Partnership Project (3GPP), "Physical channels and modulation" (Release 16), 3GPP TS 38.211 V16.1.0, Mar. 2020, Valbonne, France, 130 pages.

3rd Generation Partnership Project (3GPP), "Physical layer procedures for control" (Release 16), 3GPP TS 38.213 V16.1.0, Mar. 2020, Valbonne, France, 156 pages.

3rd Generation Partnership Project (3GPP), "Physical layer procedures for data" (Release 16), 3GPP TS 38.214 V16.1.0, Mar. 2020, Valbonne, France, 151 pages.

3rd Generation Partnership Project (3GPP), "Radio Resource Control (RRC) protocol specification" (Release 16), 3GPP TS 38.331 V16.0.0, Mar. 2020, Valbonne, France, 835 pages.

3rd Generation Partnership Project (3GPP), "User Equipment (UE) procedures in Idle mode and RRC Inactive state" (Release 16), 3GPP TS 38.304 V16.0.0, Mar. 2020, Valbonne, France, 38 pages.

* cited by examiner

WTRU POWER SAVING ASSOCIATED WITH IDLE MODE

CROSS-REFERENCE TO RELATED APPLICATIONS

This application is the 371 National Stage of International Application No. PCT/US2021/031949, filed May 12, 2021, which claims the benefit of Provisional U.S. Patent Application No. 63/025,055, filed May 14, 2020, Provisional U.S. Patent Application No. 63/091,623, filed Oct. 14, 2020, Provisional U.S. Patent Application No. 63/136,328, filed Jan. 12, 2021, and Provisional U.S. Patent Application No. 63/140,589, filed Jan. 22, 2021, the disclosures of which are incorporated herein by reference in their entireties.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein associated with wireless transmit/receive unit (WTRU) power saving (e.g., for idle mode). A WTRU may determine a time window associated with one or more paging indicators (PIs). The determination of the time window may be based on an offset from a paging occasion (PO). The offset from the PO may be an offset from a monitoring occasion (e.g., first monitoring occasion) of the PO. The WTRU may monitor for a paging indicator (PI) (e.g., a first PI) in the time window. The first PI may be cell specific. The WTRU may monitor for another PI (e.g., a second PI) in the time window. The second PI may be a WTRU-group specific PI.

The WTRU may receive system information blocks (SIBs) if a wake up indication for the WTRU is received in a single paging indication and the PI is the first PI. The WTRU may monitor for a paging physical downlink control channel (PDCCH) at a monitoring occasion of a PO in a paging frame if the second PI is received and includes an indication for the WTRU to wake up. The monitoring occasion of the PO in the paging frame may be a first monitoring occasion in time of the PO in the paging frame. In examples, the WTRU may be configured to skip the monitoring for the paging PDCCH at the PO in the paging frame if the single paging indication is received and the single paging indication is the first PI.

In examples, if the second PI is received, the WTRU may determine a paging indictor index based on the WTRU-ID and a number of WTRU groups. The WTRU may use the PI index to determine a location associated with the second PI. The location associated with the second PI may be a location associated with a paging PDCCH transmission. In examples, if the second PI is received and is in a sequence, the WTRU may determine an index based on the WTRU-ID and a number of WTRU groups. The WTRU may use the index to determine the sequence out of a set of sequences to monitor for.

BRIEF DESCRIPTION OF THE DRAWINGS

FIGS. 3A-3B show SSB/RMSI multiplexing pattern examples.

FIG. 14 shows an example of a paging indication multiplexing sample for pattern 3.

DETAILED DESCRIPTION

Figure 1A:
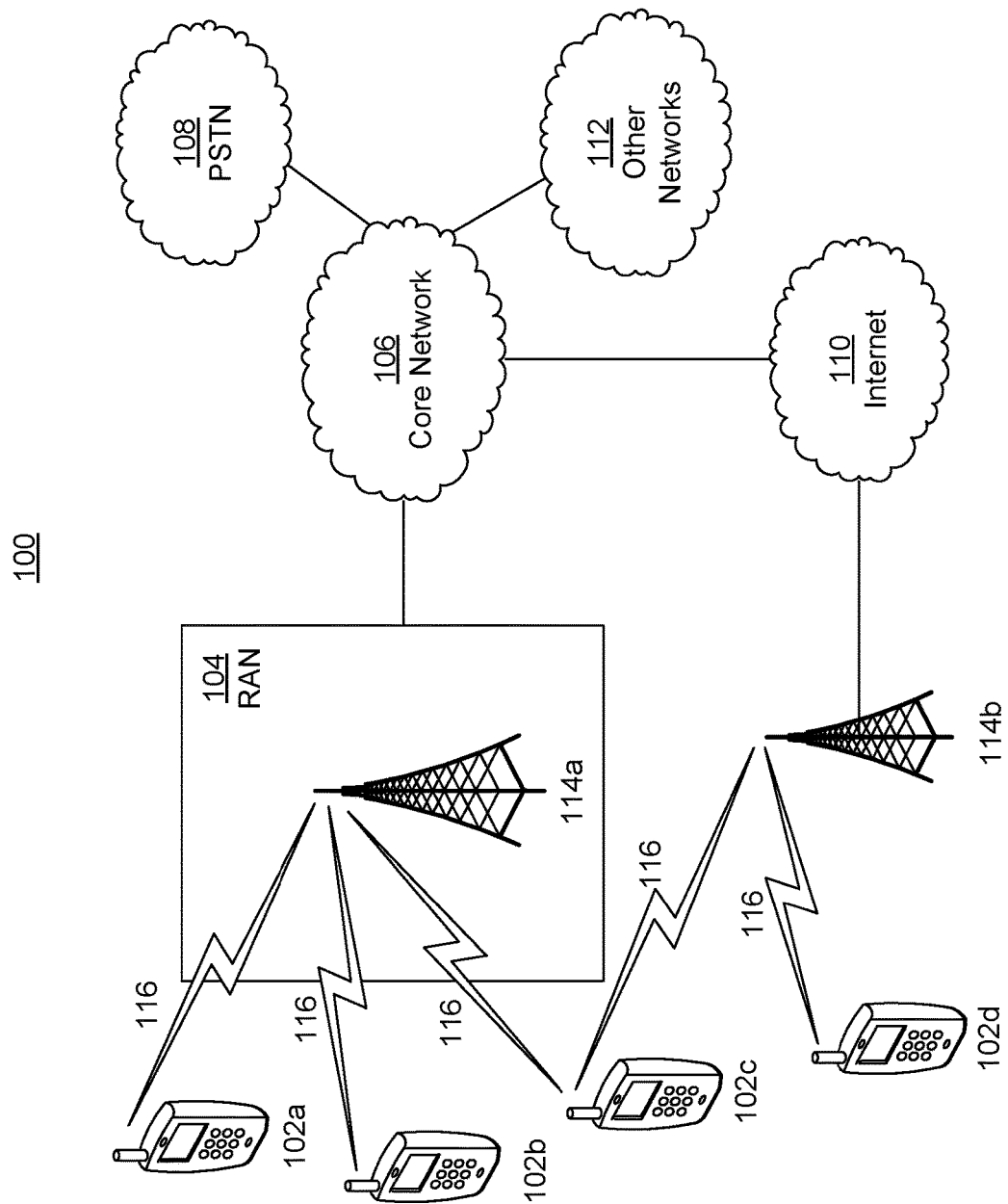
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
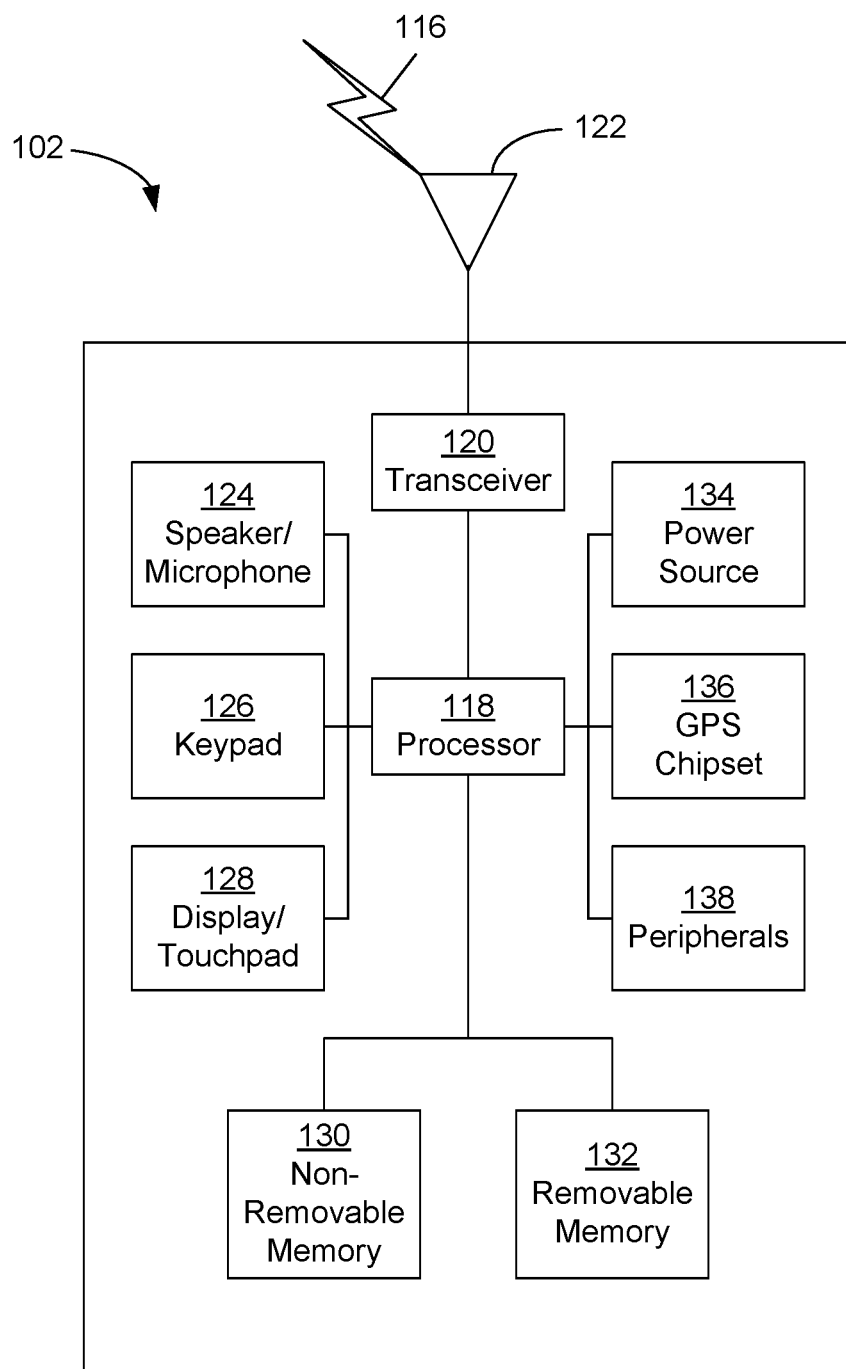
FIG. 1B is a system diagram illustrating an example wireless transmit/receive unit (WTRU) that may be used within the communications system illustrated in FIG. 1A according to an embodiment.
Figure 1C:
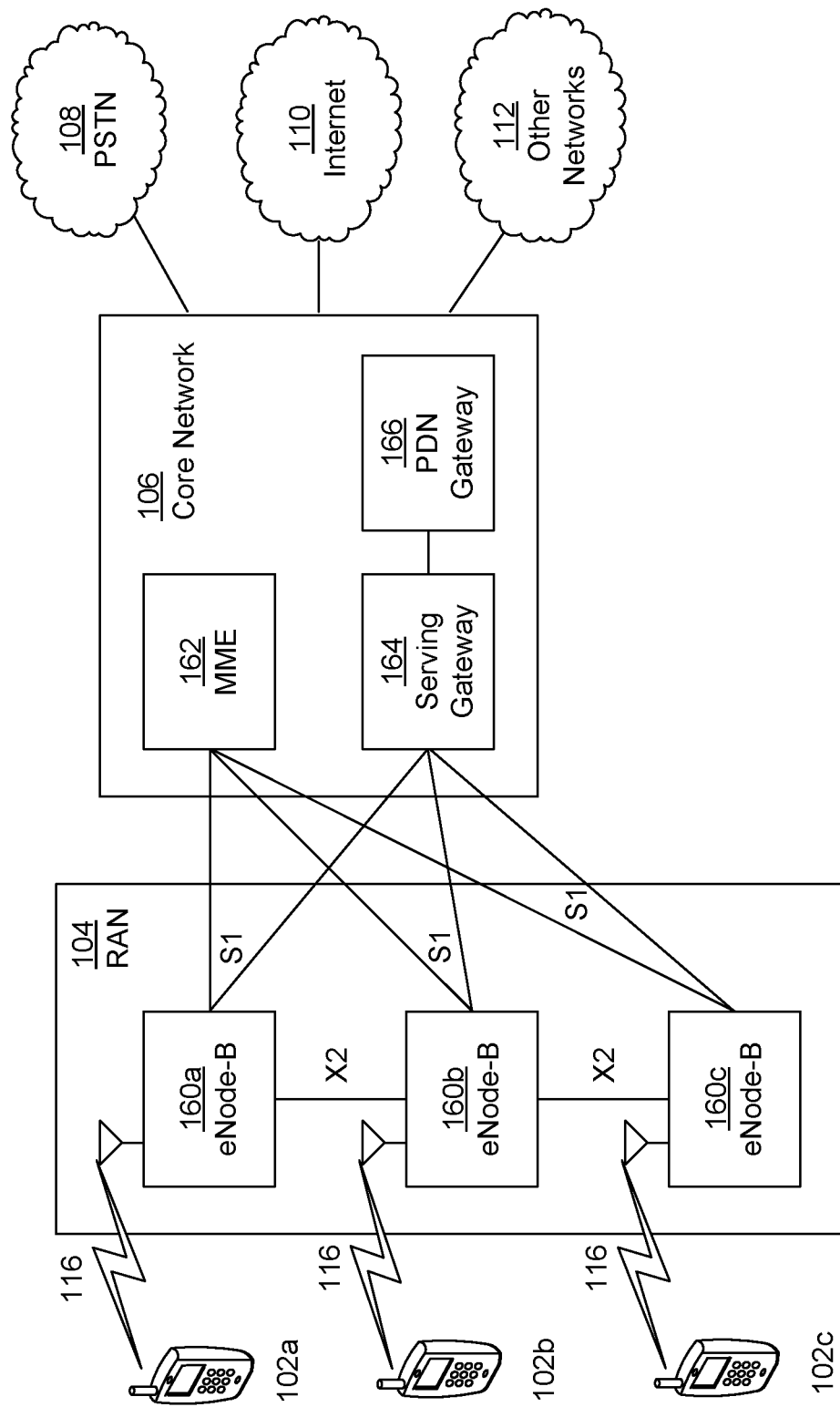
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
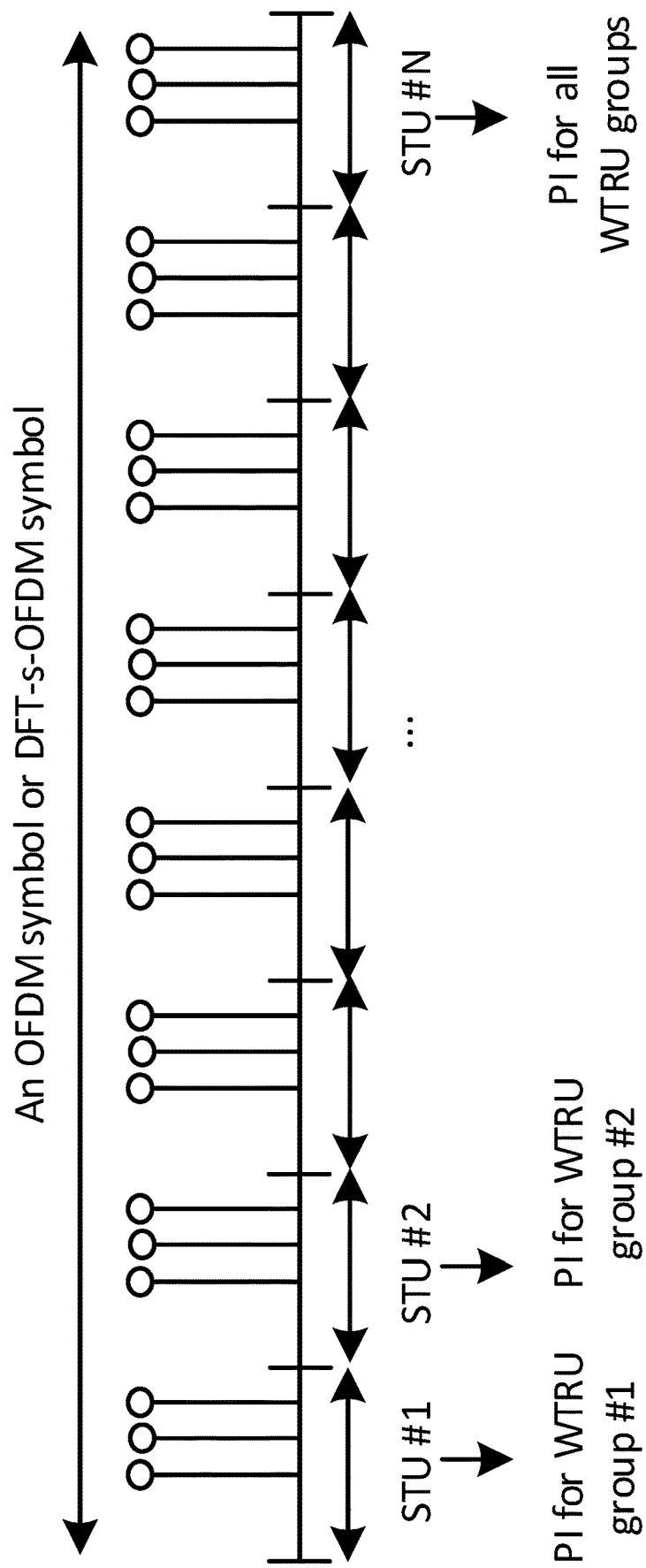
FIG. 10 illustrates an example of an association between STU and WTRU groups for a PI.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
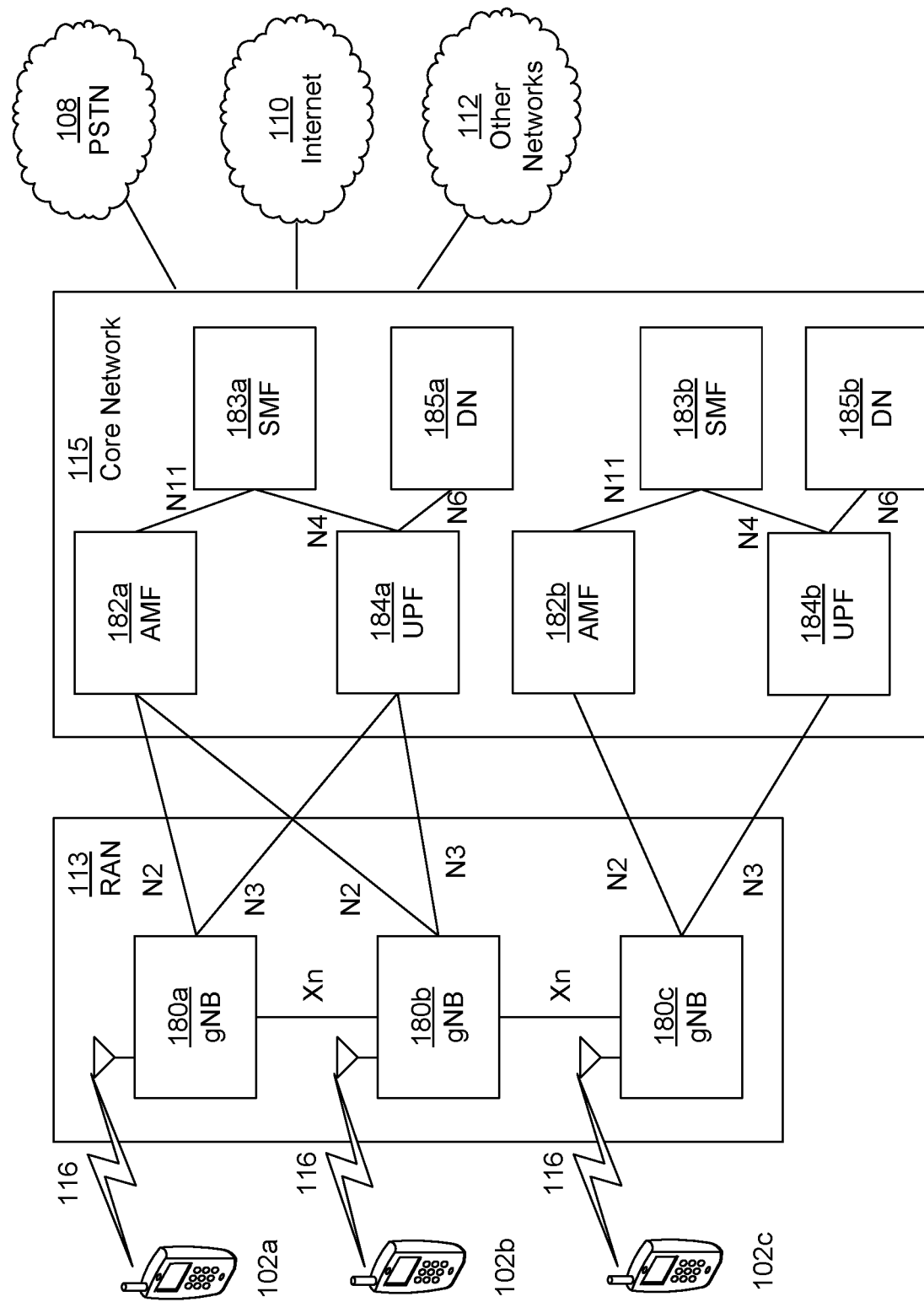
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein associated with wireless transmit/receive unit (WTRU) power saving (e.g., for idle mode). A WTRU may determine a time window associated with one or more paging indicators (PIs). The determination of the time window may be based on an offset from a paging occasion (PO). The offset from the PO may be an offset from a monitoring occasion (e.g., first monitoring occasion) of the PO. The WTRU may monitor for a paging indicator (PI) (e.g., a first PI) in the time window. The first PI may be cell specific. The WTRU may monitor for another PI (e.g., a second PI) in the time window. The second PI may be a WTRU-group specific PI.

The WTRU may receive system information blocks (SIBs) if a wake up indication for the WTRU is received in a single paging indication and the PI is the first PI. The WTRU may monitor for a paging physical downlink control channel (PDCCH) at a monitoring occasion of a PO in a paging frame (PF) if the second PI is received and includes an indication for the WTRU to wake up. The monitoring occasion of the PO in the PF may be a first monitoring occasion in time of the PO in the PF. In examples, the WTRU may be configured to skip the monitoring for the paging PDCCH at the PO in the PF if the single paging indication is received and the single paging indication is the first PI.

In examples, if the second PI is received, the WTRU may determine a paging indictor index based on the WTRU-ID and a number of WTRU groups. The WTRU may use the PI index to determine a location associated with the second PI. The location associated with the second PI may be a location associated with a paging PDCCH transmission. In examples, if the second PI is received and is in a sequence, the WTRU may determine an index based on the WTRU-ID and a number of WTRU groups. The WTRU may use the index to determine the sequence out of a set of sequences to monitor for.

A PI may be sequence and/or channel based. An indication block (e.g., indication back) may be associated with a synchronization signal (SS) block, for example, in terms of quasi colocation (QCL) (e.g., QCL-type D). Parameters of an indication (e.g., scrambling sequence) may be determined from the associated SS block and/or SS burst. WTRU behavior may be configured. For example, a WTRU may be configured to monitor (e.g., only monitor) a subset of PIs, e.g., determined from SS block measurements. Sequence parameters may indicate wake-up behavior.

A PI search space is described herein. A wake-up signal (WUS) time and/or frequency location may be determined from a WTRU identifier (ID) or a WTRU group ID.

PI monitoring occasion repetition (e.g., for shared spectrum or for coverage enhancement) is described herein. PI monitoring occasion multiplexing patterns and WTRU behavior may be configured. For example, a WTRU may be configured to monitor a PO (e.g., only one PO) and a PDCCH within the PO, e.g., based on a WUS detection.

A PI may be sub-time unit (STU) based. One or more STUs (e.g., a set of STUs) may carry a PI. A STU (e.g., each STU) may carry a subset of an information bit sequence, which may indicate one or more WTRU groups for a PI. A STU (e.g., each STU) may be associated with one or more WTRU groups for a PI. A STU (e.g., each STU) may be associated with an SSB index (e.g., for a beam determination).

A PI (e.g., all or part of it) may be carried in PDCCH. In examples, the PI may be carried in the control information (e.g., control information bits) within the PDCCH. The bits that carry the PI for a WTRU may be determined by using a WTRU ID. For example, N bits may exist and m of the N bits may target a WTRU. m and N may be integers. An indication (e.g., a PI) may be carried in other parameters of the PDCCH. For example, the indication (e.g., the PI) may be carried in parameters, such as an RNTI used to scramble cyclic redundancy check (CRC), reference signals of the PDCCH, etc.

More than one indication may be described herein. For example, a first indication may be for paging PDCCH and a second indication may be for a SIB update.

Sequence design(s) for a paging indication may be provided. SSB/paging indication multiplexing may be provided. A paging and/or system information update indication with sequences may be provided.

A system (e.g., a New Radio (NR) 5G wireless system) may implement a physical downlink control channel (PDCCH) and a physical downlink shared channel (PDSCH). Slot-based and non-slot-based transmissions and different rates of monitoring may be implemented (e.g., for PDCCH).

A Resource Element Group (REG) may be the smallest building block for PDCCH. A REG (e.g., each REG) may include of one or more resource elements (REs) (e.g., each REG may include 12 REs) on a OFDM symbol (e.g., one OFDM symbol) in time and a resource block (RB) (e.g., one RB) in frequency. In examples, a REG (e.g., each REG) may use REs for control information (e.g., a REG may use nine REs for control information) and may use REs for demodulation reference signal(s) (DM-RS(s)) (e.g., a REG may use three REs for DM-RS(s)). One or more REGs (e.g., 2, 3, or 6 REGs), which may be adjacent in time or frequency, may form an REG bundle that may be used with a precoder (e.g., the same precoder). The DM-RSs of the REG bundle may be used together, e.g., for channel estimation. One or more REGs (e.g., six REGs, which may be in the format of 1, 2, or 3 REG bundles) may form a Control Channel Element (CCE) (e.g., one CCE), which may be the smallest possible PDCCH (e.g., the smallest PDCCH transmission may be a PDCCH transmission with one CCE). A PDCCH (e.g., each PDCCH) may include one or more CCEs (e.g., 1, 2, 4, 8, or 16 CCEs). The number of CCEs for a PDCCH may be called its aggregation level (AL).

Mapping of REG bundles may use, for example, interleaving or non-interleaving. In examples (e.g., for non-interleaving mapping), consecutive REG bundles (e.g., adjacent in frequency) may form a CCE. CCEs adjacent in frequency may form a PDCCH. In examples (e.g., for interleaving mapping), REGs may be interleaved (e.g., or permuted) before being mapped to CCEs, which may result in non-adjacent REG bundles in a CCE (e.g., one CCE) and non-adjacent CCEs in a PDCCH (e.g., one PDCCH).

A Control Resource Set (CORESET) may be configured with (e.g., by a gNB) or may include, for example, at least one of the following: (i) a frequency assignment (e.g., as chunks of 6 resource blocks (RBs)); (ii) a length in time (e.g., 1-3 OFDM symbols); (iii) a type of REG bundle; and/or (iv) a type of mapping from REG bundles to CCEs (e.g., whether it is interleaving or non-interleaving). There may be up to N CORESETs in a bandwidth part (BWP) (e.g., each BWP). In examples (e.g., where N=3), there may be 12 CORESETs in four possible BWPs.

A WTRU may monitor or may be assigned with a set of PDCCH candidates (e.g., to monitor). A set of PDCCH candidates may be monitored, for example, during the blind detection of PDCCH. A search space or a set of search spaces (e.g., for multiple ALs) may be or may include a set of PDCCH candidates (e.g., to monitor, such as with blind detection). A search space (e.g., each search space) or set of search spaces may be configured, for example, by at least one of the following: (i) an associated CORESET; (ii) a number of candidates for or within an AL (e.g., each AL); and/or (iii) a set of monitoring occasions. Monitoring occasions may be determined, for example, by one or more of a monitoring periodicity (e.g., in terms of slots), a monitoring offset, and/or a monitoring pattern (e.g., with 14 bits corresponding to the possible patterns of symbols inside a slot).

Idle mode discontinuous reception (DRX) and paging may be provided (e.g., supported) in NR. A WTRU may use DRX (e.g., in RRC_IDLE and RRC_INACTIVE states), for example, to reduce power consumption. A WTRU may, for example, monitor a PO (e.g., one PO) per DRX cycle. A PO may be a set of PDCCH monitoring occasions. A PO may include multiple time slots (e.g., subframe or OFDM symbol), for example, where paging downlink control information (DCI) may be sent. A PF (e.g., one PF) may be a radio frame (e.g., one radio frame). A PF may include one or more PO(s) or a starting point of a PO. A paging indication may tell a WTRU to monitor one or more POs. The paging indication and those one or more POs may be mapped. For example, a paging indication may tell the WTRU to monitor the next one PO, or the next two POs, etc. Mapping could be one-to-one or one-to-many. This mapping is referred to as being associated (e.g., an associated PO).

A WTRU may (e.g., in multi-beam operations) assume (e.g., expect based on a configuration), for example, that a paging message (e.g., the same paging message) and a short message (e.g., the same short message) are repeated in transmitted beams (e.g., in all transmitted beams). A WTRU may assume that it may select the beam(s) for the reception of the paging message and short message. A paging message may be the same for RAN initiated paging and CN initiated paging.

A WTRU may initiate a radio resource control (RRC) Connection Resume procedure, for example, if receiving RAN initiated paging. A WTRU may move to RRC_IDLE and inform NAS, for example, if the WTRU receives a CN initiated paging in RRC_INACTIVE state.

A WTRU may monitor the $(i\_s+1)^{th}+PO$, for example, if SearchSpaceId other than 0 is configured for pagingSearchSpace). A PO may be a set of 'S*X' (e.g., consecutive) PDCCH monitoring occasions, where 'S' may be, for example, the number of (e.g., actual transmitted) SSBs determined according to ssb-PositionsInBurst in SIB1 and where X may be, for example, the nrofPDCCH-MonitoringOccasionPerSSB-InPO (e.g., if configured) or equal to 1 (e.g., if not configured). The $[x*S+K]^{th}$ PDCCH monitoring occasion for paging in the PO may correspond to the Kth transmitted SSB, where, for example, x=0, 1, . . . , X−1, K=1, 2, . . . , S. PDCCH monitoring occasions for paging that do not overlap with UL symbols (e.g., determined according to tdd-UL-DL-ConfigurationCommon) may be (e.g., sequentially) numbered from zero (e.g., starting from the first PDCCH monitoring occasion for paging in the PF). The starting PDCCH monitoring occasion number of $(i\_s+_1)^{th}$ PO may be the $(i\_s+1)^{th}$ value of the firstPDCCH-MonitoringOccasionOfPO parameter; for example, if firstPDCCH-MonitoringOccasionOfPO is present. The starting PDCCH monitoring occasion number of $(i\_s+1)^{th}$ PO may be equal to i_s*S*X, for example, otherwise. In examples, (e.g., if X>1), the WTRU may not (e.g., be required to) monitor the subsequent PDCCH monitoring occasions for a PO, for example, if the WTRU detects a PDCCH transmission addressed to a paging radio network temporary identifier (P-RNTI) within the PO.

In examples, one or more of the following parameters may be used (e.g., for the calculation of PF and i_s): T, N, Ns, PF_offset, and/or WTRU_ID. Parameter T may be, for example, a DRX cycle of the WTRU. T may be determined, for example, by the shortest of the WTRU specific DRX value(s) (e.g., if configured by RRC and/or upper layers) and a default DRX value (e.g., broadcast in system information). In examples, the default value may be applied (e.g., in RRC_IDLE state), for example, if a WTRU specific DRX is not configured by upper layers). Parameter N may be, for example, the number of total PFs in T. Parameter Ns may be, for example, the number of POs for a PF. Parameter PF offset may be, for example, the offset used for a PF determination. Parameter WTRU_ID may be, for example, 5G-S-TMSI mod 1024.

Parameters Ns, nAndPagingFrameOffset, nrofPDCCH-MonitoringOccasionPerSSB-InPO, and the length of default DRX cycle may be signaled, for example, in SIB1. The values of N and PF_offset may be derived, for example, from the parameter nAndPagingFrameOffset. The parameter first-PDCCH-MonitoringOccasionOfPO may be signaled, for example, in SIB1 (e.g., for paging in initial DL BWP). The parameter first-PDCCH-MonitoringOccasionOfPO may be signaled in a corresponding BWP configuration, for example, for paging in a DL BWP other than the initial DL BWP.

A WTRU may use as s default identity WTRU_ID=0 in the PF and i_s formulas (e.g., as described herein), for example, if the WTRU has no 5G-S-TMSI (e.g., such as if the WTRU has not yet registered onto the network).

A WTRU may monitor for or listen to a paging message, for example, to know about one or more of the following: incoming calls, system information change, Earthquake and Tsunami Warning Service (ETWS) notification (e.g., for ETWS capable WTRUs), Commercial Mobile Alert System (CMAS) notification, and Extended Access Barring parameters modification.

A WTRU may (e.g., in RRC Idle state) monitor short messages (e.g., transmitted with a paging RNTI (P-RNTI) over DCI) and a paging channel (e.g., for CN paging using 5G-S-TMSI). A WTRU may (e.g., in RRC Inactive state) monitor short messages (e.g., transmitted with P-RNTI over DCI) and a paging channel (e.g., for CN paging using 5G-S-TMSI and RAN paging using full-RNTI). A WTRU may (e.g., in RRC Connected state) monitor short messages (e.g., transmitted with P-RNTI over DCI).

A SS burst and an SS block may be provided (e.g., supported). An SS burst may be used, for example, if multiple beams are used for initial access. An SS burst may be transmitted periodically (e.g., every 20 ms). A SS burst (e.g., each SS burst) may include one or more SS blocks.

One or more SS blocks in an SS burst may be associated with one or more beams. The number of SS blocks in an SS burst may be determined, for example, by a gNB (e.g., based on the number of beams used at the gNB). In examples, NB SS blocks may be used or transmitted in an SS burst, for example, if NB beams are used at a gNB.

An SS block (e.g., each SS block) may include, for example, one or more of the following: a primary synchronization signal (PSS), a secondary synchronization signal (SSS), and/or a physical broadcasting channel (PBCH).

Figure 2:
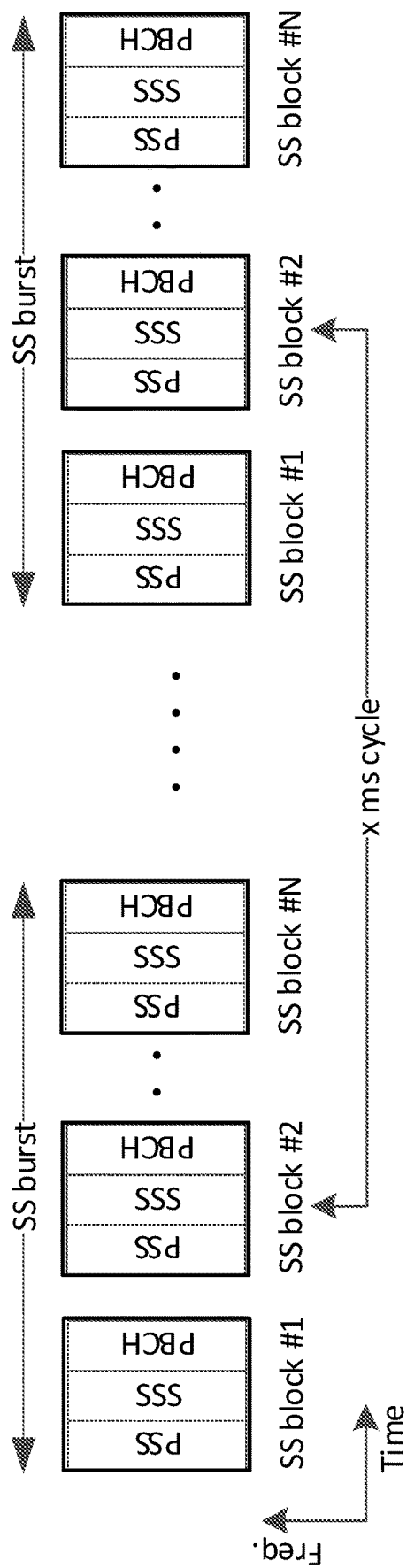
FIG. 2 is a diagram illustrating an example of an SS burst and an SS block.

FIG. 2 is a diagram illustrating an example of an SS burst and an SS block. FIG. 2 shows an example of an SS burst with an x[ms] cycle and multiple SS blocks in an SS burst.

Figures 3A, 3B:
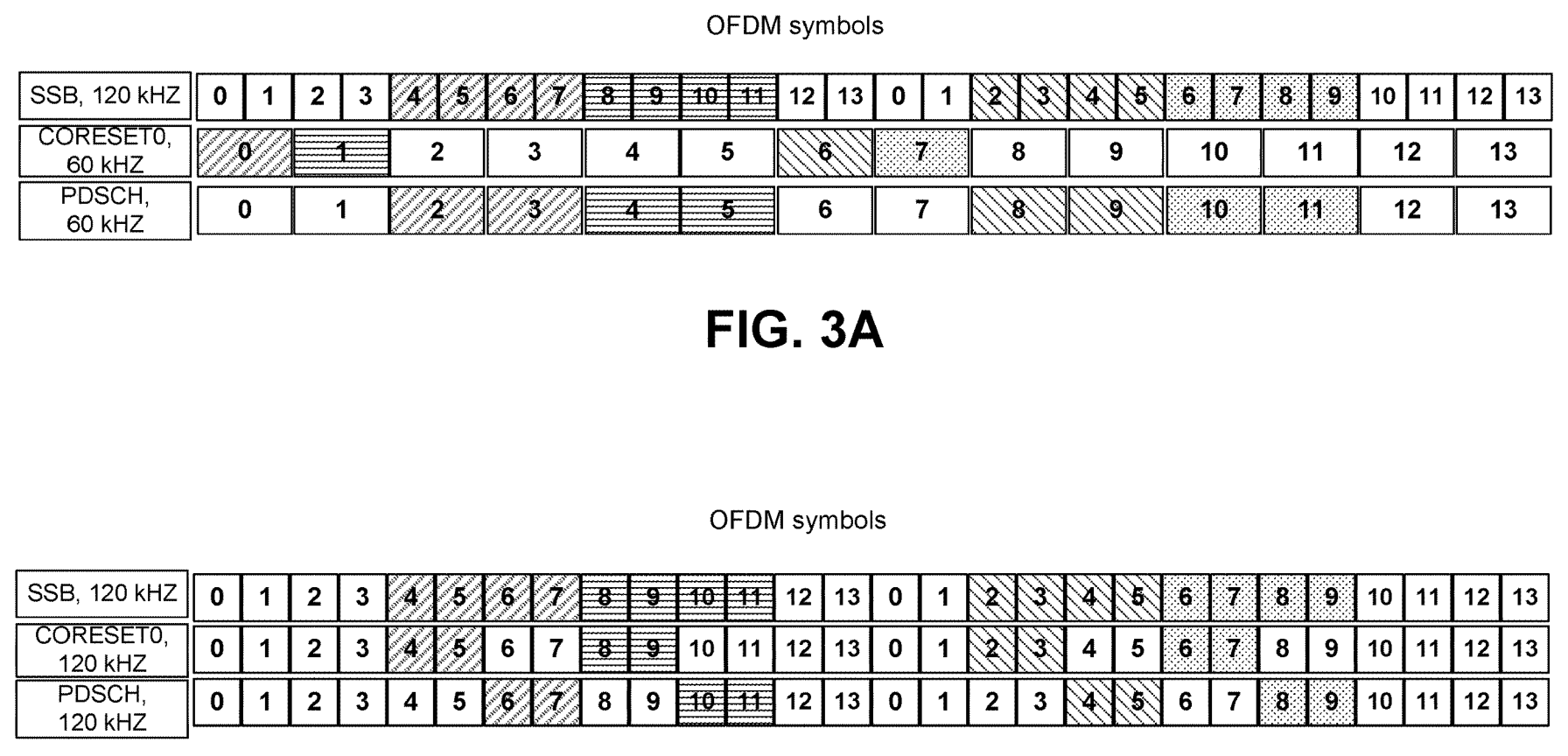

FIGS. 3A-3B show SSB/RMSI multiplexing pattern examples. FIGS. 3A-3B shows two of the SSB/RMSI multiplexing patterns (pattern 2 and pattern 3, respectively)

where SSBs may be multiplexed with, e.g., the RMSI PDCCH and the RMSI PDSCH. As shown in FIGS. 3A-3B, the SSB and RMSI PDCCH/PDSCH denoted with the same colors may be associated to each other. In examples, the SSB and RMSI PDCCH/PDSCH may be QCLed to each other. FIG. 3A shows a multiplexing pattern where the SS/PBCH blocks and the associated CORESET0 may be transmitted in different time instances; the SSBs and the RMSI PDSCH may be transmitted in the same time instances. In examples, an SSB may be transmitted in OFDM symbols {4-7} and the corresponding CORESET0 may be transmitted in OFDM symbol {0} in the same slot while the associated PDSCH may be transmitted in OFDM symbols {2, 3}. In FIG. 3A, the subcarrier spacing (SCS) of the SSB may be set to 120 kHz and the SCS of the CORESET0/PDSCH may be set to 60 kHz. Since the subcarrier spacings used for the SSBs and the CORESET0/PDSCH may be different, the CORESET0/PDSCH OFDM symbol may be two times as long as the SSB OFDM symbol. FIG. 3B shows a pattern for a different set of SCSs. As shown in FIG. 3B, the SSBs and the RMSI PDCCH/PDSCH may be transmitted in the same OFDM symbols. In some patterns (e.g., pattern 1), the SSBs and the associated RMSI PDCCH/PDSCH may be multiplexed in the time domain (e.g., in the time domain only), e.g., the SSBs and the associated RMSI PDCCH/PDSCH may not be transmitted in the same OFDM symbols.

Beamforming may be supported. A WTRU may transmit or receive a physical channel or reference signal, for example, according to at least one spatial domain filter. The term "beam" may be used to refer to a spatial domain filter.

A WTRU may transmit a physical channel or signal using a spatial domain filter (e.g., the same spatial domain filter) that is used as the spatial domain filter for receiving a reference signal (RS) (e.g., a channel state information RS (CSI-RS)) or an SS block. A WTRU transmission may be referred to as a "target." A received RS or SS block may be referred to as a "reference" or a "source." In examples, a WTRU may transmit a target physical channel or signal according to a spatial relation with a reference to an RS or SS block.

A WTRU may transmit a physical channel or signal (e.g., first physical channel or signal), for example, according to a spatial domain filter (e.g., same spatial domain filter) that is used as the spatial domain filter for transmitting another physical channel or signal (e.g., second physical channel or signal). The first and second transmissions may be referred to as "target" and "reference" (or "source"), respectively. In examples, a WTRU may transmit a first physical channel or signal (e.g., target physical channel or signal) according to a spatial relation with a reference to a second physical channel or signal (e.g., reference physical channel or signal).

A spatial relation may be implicit. A spatial relation may be configured (e.g., by RRC) and/or signaled (e.g., by a MAC control element (CE) or a DCI). A WTRU may transmit (e.g., implicitly transmit) a physical uplink shared channel (PUSCH) and a DM-RS of a PUSCH for example according to a spatial domain filter (e.g., same spatial domain filter) that may be indicated by a sounding reference signal (SRS) (e.g., indicated by an SRS resource indicator (SRI)), indicated in DCI, and/or configured by RRC). A spatial relation may be configured via RRC signaling for an SRI or signaled by a MAC-CE for a physical uplink control channel (PUCCH). A spatial relation may be referred to as a "beam indication."

A WTRU may receive a first downlink channel or signal (e.g., first target downlink channel or signal), for example, according to a spatial domain filter (e.g., the same spatial domain filter) or a spatial reception parameter (e.g., the same spatial reception parameter) that may be used in a second downlink channel or signal (e.g., reference downlink channel or signal). In examples, an association may exist between a physical channel (e.g., PDCCH or PDSCH) and the physical channel's respective DM-RS. An association may exist (e.g., at least if the first and second signals are reference signals), for example, if a WTRU is configured with a QCL assumption (e.g., type D) between corresponding antenna ports. An association may be configured, for example, as a transmission configuration indicator (TCI) state. A WTRU may be indicated (e.g., receive an indication of or be configured with) an association between a CSI-RS or SS block and a DM-RS, for example, by an index to a set of TCI states (e.g., configured by RRC and/or signaled by MAC-CE). An indication may be referred to as a "beam indication."

A WTRU may monitor (e.g., be expected to monitor) a paging channel (e.g., in RRC idle and/or RRC Inactive states), for example, one or more times in a DRX cycle (e.g., each DRX cycle). A WTRU may monitor a paging PDCCH and may decode the paging PDSCH. The power consumed (e.g., during the wake-up period from deep sleep and power spent on decoding the PDCCH and the PDSCH) may be wasted, for example, if the WTRU is not paged. Power consumption may increase, for example, as the DRX cycle periodicity gets smaller.

A WTRU may reduce power consumption while monitoring a paging channel. Paging indication(s) may be provided (e.g., supported). A WTRU may monitor for paging indication(s) (e.g., a common PI and a WTRU group-specific PI, as shown in FIG. 7B) that may indicate to the WTRU whether to monitor an associated PO. Paging indication(s) may carry information (e.g., in addition to indicating whether to monitor a PO, for example see the common PI in FIG. 7B). Paging indication(s) may be associated with one or more POs. Paging indication(s) may (e.g., be used to) indicate to the WTRU whether to monitor associated POs (e.g., the WTRU group-specific PI in FIG. 7B may indicate to wake up and monitor for a paging PDCCH in the PO that is associated with the WTRU group-specific PI).

A paging indication (e.g., the WTRU group-specific PI as shown in FIG. 7B) may be a sequence based indication. In examples, a WTRU may (e.g., or may not) monitor an associated PO. For example, if the WTRU detects a sequence (e.g., a specific sequence, such as specified, configured or otherwise known sequence), the WTRU may monitor the associate PO. A WTRU may not monitor a PO (e.g., an associated PO), for example, if the WTRU does not detect a specific sequence and/or if the WTRU detects a sequence other than the specific sequence. In examples, a WTRU may not monitor a PO (e.g., an associated PO), for example, if the WTRU detects a specific sequence. A WTRU may monitor a PO, for example, if the WTRU does not detect a specific sequence.

A paging indication (e.g., the WTRU group-specific PI as shown in FIG. 7B) may be a channel based indication. A WTRU may receive a transmission (e.g., may receive a channel via the transmission). A parameter of the channel may indicate to the WTRU whether to monitor a PO (e.g., an associated PO). In examples (e.g., if the channel paging indication uses a PDCCH-based channel), an RNTI that may be used to scramble the CRC of the PDCCH, the payload bits carried within the PDCCH, etc. may (e.g., be used to) indicate to the WTRU whether to monitor a PO (e.g., an associated PO).

A paging signal/channel may (e.g., be used to) refer to a paging indication with a sequence and/or a channel component. A paging indication signal/channel may be referred to as a wake-up signal (WUS), for example, a WUS block or included in a WUS block (e.g., a WUS burst may include WUS block(s)).

A paging signal/channel may be associated with SSBs. A paging indication may be a signal that may be received and/or monitored in a time/frequency resource, which may be configured for or associated with one or more POs. There may be multiple types (e.g., two types) of paging (e.g., in NR). There may be paging in RRC idle. There may be paging in RRC inactive. A PI may be implemented for (e.g., those) multiple modes (e.g., two modes). A paging indication may be, for example, at least one of the following: a sequence (e.g., Zadoff-Chu sequence, gold-sequence, m-sequence), control information (e.g., DCI, master information block (MIB), remaining minimum system information (RMSI), other system information (OSI), a data payload (e.g., PDCCH data, etc.), and/or a waveform (e.g., a time domain waveform signature)).

A paging indication may be associated with one or more POs or a group of WTRUs. A group of WTRUs may be determined, for example, based on a WTRU identity (e.g., international mobile subscriber identity (IMSI), S temporary mobile subscriber identity (s-TMSI), etc.). A least significant bit (LSB) or a most significant bit (MSB) of a WTRU identity may be used to determine which WTRUs may be associated with a paging indication.

Paging indication, PI, paging monitoring indicator, paging monitoring wake up signal, paging wake up signal, paging power saving, power saving signal, and paging monitoring power saving signal may be used interchangeably.

One or more paging indications may be configured (e.g., via a broadcasting channel or a RRC configuration) for one or more POs, for example, to indicate whether a WTRU may need to (e.g., is to) monitor associated POs. Configuration information for a paging indication may include, for example, one or more of following, which may be used by a WTRU for monitoring, receiving, and/or processing paging indication(s): (i) a time/frequency resource during which the WTRU may monitor for/receive paging indication(s), where the time/frequency resource may be determined based on one or more of: a CORESET-id and/or Search space-id); an SFN number, a slot number, a subframe number, and/or a symbol number; a cell-id, a carrier-id, and/or a BWP-id; a physical resource block (PRB) or a PRB group number; or a duty cycle (or periodicity); (ii) beam related information which the WTRU may use to determine a beam to monitor/receive paging indication(s) (e.g., one or more associated reference signals in terms of QCL type-D); (iii) a type of paging indication to be monitored for/received by the WTRU (e.g., sequence, DCI, or waveform signature); (iv) an associated PO (or P-RNTI), where the associated PO may be associated with the paging indication(s); (v) timing information with respect to an associated PO (e.g., an offset value with respect to the associated PO) and/or a paging PDCCH monitoring occasion (e.g., where the WTRU may use the timing information to determine a time to monitor for/receive the paging indication(s); and/or (vi) a repetition number (e.g., denoting the number of times the PI may be or is repeated).

One or more types of PIs may be used. A first type of PI may be used, for example, if a WTRU is monitoring a PO in RRC idle. A second type PI may be used, for example, if a WTRU is monitoring a PO in RRC inactive. A first type of PI may be based on, for example, a sequence. A second type of PI may be based on, for example, DCI (or vice-versa).

A received PI may indicate that a WTRU monitor a PO in RRC inactive while a lack of a received PI may indicate that the WTRU monitor a PO in RRC idle, or vice-versa. In examples, a WTRU may be configured with a PI that may be associated with one or more POs. A WTRU may skip monitoring associated POs, for example, if a WTRU does not receive a PI in RRC inactive mode. A WTRU may monitor associated POs, for example, if the WTRU does not receive a PI in RRC idle mode. A WTRU may (e.g., alternatively) monitor POs irrespective of the reception status of a PI in RRC idle mode (and/or in RRC inactive mode).

A PI may be used to indicate to a WTRU to monitor a PO, for example, if the serving cell (e.g., in RRC idle or RRC inactive) meets at least one of the following conditions: (i) the serving cell is one of the WTRU serving cells when the RRC connection was released; (ii) the serving cell is part of the same routing area or tracking area as a serving cell that was one of the WTRU serving cells when the RRC connection was released; and/or (iii) the serving cell is one of a set of serving cells indicated to use of a PI as part of a RRC message, e.g., such as an RRC connection release.

A serving cell may be identified, for example, by at least one of a physical cell ID (PCI), a carrier, and/or a cell global identity.

A paging indication signal/channel may be associated with one or more SS blocks and/or one or more SS bursts. An association may mean (e.g., indicate) that a feature of the paging indication, such as a sequence (e.g., a Zadoff-Chu sequence), a reference signal (e.g., DM-RS) antenna port, and the associated SS block, are quasi co-located (e.g., with respect to QCL-Type D properties). A WTRU may use (e.g., may be expected to use) antenna beam(s) (e.g., the same receive multiple antenna beams) to receive an SS block and the associated paging indication signal and/or channel, if a QCL relationship is established.

An association may mean (e.g., further mean), indicate, etc. that parameters (e.g., certain parameters of a paging indication signal/channel to monitor) may be determined based on parameter(s) of the associated SS block and/or parameter(s) of the SS burst that may include the associated SS block. Paging signal/channel parameters may include one or more paging signal/channel resources, such as the sequence to monitor, the DM-RS of the paging indication channel, the time and frequency resources to monitor for the paging indication, the QCL type and relationship, etc. SS blocks and/or SS bursts may be used (e.g., used by a WTRU) to determine the paging indication resources to be used to monitor the paging indication (e.g., sequence to monitor, time and frequency resources to monitor, which receive beam to use (such as QCL type-D relationship), etc.).

A WUS may be transmitted as a burst. A burst may include one or more WUS blocks (e.g., PIs). A WUS block (e.g., each WUS block) may include a signal component and/or a channel component. A WTRU may use a separate receive beam to receive each WUS block (e.g., a first receive beam for a first WUS block, a second receive beam for a second WUS block, etc.). In examples, a receive beam that may be used to receive a WUS block (e.g., first WUS block) may be determined from a beam used to receive the associated corresponding SS block. A component of a WUS block (e.g., sequence, DM-RS antenna port, etc.) and the corresponding SS block may (e.g., be assumed to) have a QCL relationship (e.g., QCL type-D).

A paging PDCCH monitoring occasion and/or the PDCCH's paging PDSCH may have a QCL relationship with an associated WUS block (e.g., a QCL type-D relationship). In an example association, the WUS block (e.g., PI) and the associated paging PDCCH monitoring occasion may be associated with the same SSB.

A subset of WUS blocks (e.g., PIs) may be monitored. In examples, a WTRU may monitor or may be configured to monitor one or more WUS blocks. A WTRU may monitor or may be configured to monitor one or more (e.g., 1, 2, or 4) of the WUS blocks, for example, if there are 64 WUS blocks corresponding to 64 SSBs. A WTRU may use the result of one or more measurements to choose the WUS blocks to monitor. In examples, a WTRU may measure the signal quality of SS blocks (e.g., using reference signal received power (RSRP)). The WTRU may identify K (e.g., K=1) SS blocks with the highest signal quality. The WTRU may monitor the WUS blocks corresponding to the K SSBs (e.g., only the WUS blocks corresponding to the K SSBs). The value K may be configured (e.g., configured explicitly) within a broadcast signal (e.g., within a SIB or an MIB).

A WTRU may monitor an associated paging PDCCH (e.g, only an associated paging PDCCH), if a wake-up indication is detected in a certain WUS block (e.g., in a WTRU-group specific PI, as shown in FIG. 7B). The monitored paging PDCCH and the WUS block may be (e.g., expected to be) associated with the same SS block.

A WUS sequence/channel design may be provided. In examples, a WTRU may (e.g., may be configured to) monitor a WUS, for example, with one or more (e.g., at least two) components, such as a sequence based component and a channel based (e.g., PDCCH based) component. Examples provided herein are similarly applicable, for example, if one component is used or configured. Each component may be configurable.

A WUS sequence (e.g., PI sequence) may be a Zadoff Chu sequence, for example, in accordance with Eq. 1:

$$w(n) = \theta(n) \cdot e^{\frac{-j\pi u n(n+1)}{N}} e^{\frac{j2\pi g n}{N}} \quad \text{Eq. 1}$$

where u may be a root index, n=0:N−1 may be a sample index, N may be a sequence length, g may be a phase shift parameter, and θ(n) may be a scrambling sequence. A sequence may be mapped, for example, to a set of N subcarriers (e.g., a set of predetermined N subcarriers) in at least one OFDM symbol allocated for the sequence component. The phase shift may create a cyclic shift in the time domain. Examples presented herein may be similarly applicable if a sequence with a cyclic shift parameter is used instead of a phase shift parameter.

In examples, a scrambling sequence may be generated per WUS block. A scrambling sequence may be generated with an initialization that is different (e.g., different from one WUS block to another). For example, a sequence mapped to a OFDM symbol (e.g., one OFDM symbol) in a WUS block may be in accordance with Eq. 2:

$$w(n) = \theta(m) \cdot e^{\frac{-j\pi u n(n+1)}{N}} e^{\frac{j2\pi g n}{N}} \quad \text{Eq. 2}$$

where m may be given by m=n+N*k, k may be given by k=0, 1, ..., M−1, M may be the number of OFDM symbols carrying the sequence in a WUS block, and k may be the OFDM symbol index.

In examples, a scrambling sequence (e.g., one scrambling sequence) may be generated per WUS burst (e.g., per one WUS burst). A length of the scrambling sequence may be N*M*L, where L may be the number of WUS blocks in a WUS burst (e.g., m=n+N*k, k=0, 1, ..., L*M−1). In examples, a scrambling sequence may be the same for OFDM symbols (e.g., all OFDM symbols) in a WUS block, but may be different between WUS blocks in a WUS burst. In examples, a scrambling sequence may be the same for OFDM symbols (e.g., all OFDM symbols) in a WUS burst. OFDM symbols may refer to the symbols allocated for a WUS sequence.

A scrambling sequence (e.g., out of a set of sequences) of a WUS block (e.g., a PI) may be a function of one or more parameters. In examples, a scrambling sequence may be a pseudo random sequence and its initialization may be determined (e.g., determined f the WTRU) from one or more parameters. The one or more parameters may include one or more of the following: (i) a cell ID; (ii) a WTRU ID and/or a WTRU group ID; (iii) a portion of a WTRU ID or a WTRU group ID (e.g., a number of LSB and/or MSB bits); (iv) a parameter determined by the index of the SSB associated with a WUS block (e.g., a WTRU may monitor (e.g., be expected to monitor) a WUS block with a scrambling sequence that may be generated as a function of the index of the SS block associated with the WUS block, where the WUS block and associated SS block have the same index, for example, if the SSB and WUS block association is one-to-one); (v) a parameter determined by the WUS block index (e.g., the WUS block index may refer to an index of a WUS block within a WUS burst, for example, there may be 64 WUS blocks in a burst and the WUS block index may be 1 to 64, or 0 to 63, etc.); (vi) a function of the WUS block index and the associated SSB index; (vii) a parameter based on the time location of the associated SSB (e.g., the frame number, the subframe index, the absolute subframe index, the first slot index of the associated SSB, etc.); (viii) a parameter based on the time location of the WUS burst that may include the WUS block (e.g., the frame number of the WUS burst, and/or the half-frame index (e.g., 0 or 1)); (ix) a parameter determined by an index of the WUS burst that may include the WUS block (e.g., there may be 4 WUS bursts associated with a PO and the WUS burst index may be 1 to 4, or 0 to 3, etc.); (x) a parameter of the PO associated with the WUS (e.g., the index of the first slot of the PO, the index of the first frame of the PO, etc.); (xi) a PO index (e.g., if the WUS block is associated with more than one PO); or (xii) a payload of k bits, such as a 1 bit information (e.g., $2^k$ different scrambling sequences may be generated for a payload of k bits, where a scrambling sequence (e.g., each scrambling sequence) may indicate the k bit payload, where a 1-bit information may indicate to the WTRU whether to monitor an associated PO, and where the payload indicated by the scrambling sequence may be combined by the WTRU with information (e.g., other information) to determine a behavior.

A paging indication sequence may be based on a pseudorandom sequence (e.g., such as a m-sequence, or a gold sequence). The paging indication sequence may be expressed in accordance with Eq. 3:

$$w(n)=[1-2x\_0((n+c\_0) \bmod N)][1-2x\_1((n+c\_1) \bmod N)] \quad \text{Eq. 3}$$

or in accordance with Eq. 4:

$$w(n)=[1-2x((n+c) \bmod N)] \quad \text{Eq. 4}$$

where n may be the sequence sample index, N may be the sequence length such that n=0, 1, ... N−1; x_0 (n), x_1 (n), and x(n) characterizes a generator polynomial, and c_0, c_1, c may be the cyclic shift parameters. Note that the examples presented herein may be applicable to other types of sequences (e.g., regardless of the specific sequence used as the wake-up signal) and/or modulation types applied to the sequence, e.g., binary phase shift keying (BPSK), quadrature phase shift keying (QPSK), pi/2 BPSK, etc.

At least one of the cyclic shift parameters of the WUS sequence (e.g., PI sequence) may be a function of at least one of the following: (i) a cell ID; (ii) a WTRU ID and/or WTRU group ID; (iii) a portion of a WTRU ID or a WTRU group ID (e.g., some number of LSB and/or MSB bits); (iv) a parameter determined by the index of the SSB associated to the WUS block; (v) a parameter determined by the WUS block index (e.g., the WUS block index may refer to an index of a WUS block within a WUS burst, for example, there may be 64 WUS blocks in a burst and the WUS block index may be 1 to 64; or 0 to 63, etc.); (vi) a function of the WUS block index and the associated SSB index; (vii) a parameter based on the time location of the associated SSB (e.g., the frame number, the subframe/slot index of the SSB within a frame, the absolute subframe index, the first slot index of the associated SSB within a frame, etc.); (viii) a parameter based on the time location of the WUS burst which may include the WUS block (e.g., the frame number of the WUS burst, and/or the half-frame index (e.g., 0 or 1)); (ix) a parameter determined by an index of the WUS burst which may include the WUS block (e.g., there may be 4 WUS bursts associated to a PO and the WUS burst index may be 1 to 4, or 0 to 3, etc.); (x) a parameter of the PO that is associated to the WUS (e.g., such as the index of the first slot of the PO, the index of the first frame of the PO); (xi) the PO index, for example if the WUS block is associated to a PO (e.g., more than one PO); or (xii) a payload of k bits (e.g., a 1-bit information, which may be used to indicate to the WTRU the proper action to take if receiving the sequence with the corresponding cyclic shift value(s) such as monitoring the PO, etc.).

In examples, if the paging indication sequence includes cyclic shift parameters (e.g., two cyclic shift parameters), one of the cyclic shifts (e.g., c_0) may be set to a fixed value such as 0, and the other cyclic shift parameter (e.g., c_1) may take one of at least two possible values. In examples, one of the possible values may be used to indicate to the WTRU to monitor the associated PO and the other possible value may be used to indicate to the WTRU not to monitor the associated PO. If a cyclic shift (e.g., one cyclic shift) is present in the sequence, this cyclic shift may take at least two possible values to indicate to the WTRU to monitor or not monitor the associated PO. In examples, possible values (e.g., a pair of two possible values) for the cyclic shift may be determined as {0; floor(N/2)} or {floor(N/4); floor(3N/4)}. The WTRU may estimate the transmitted cyclic shift value and map it to a corresponding action (e.g., the WTRU may determine to monitor an associated PO if the cyclic shift value estimated as {0} or the WTRU may determine not to monitor an associated PO if the cyclic shift value estimated as {floor(N/2)}). In examples, a cyclic shift bit (e.g., the second cyclic shift bit) may indicate to the WTRU a presence or non-presence of a configured reference signal, where the configuration of the reference signal may be carried in the system information, e.g., in a SIB.

In examples, it may be possible for the cyclic shift value to take more than two possible values. The cyclic shift value may take four values and the WTRU may determine one of the following indications based on which value is estimated (e.g., the payload may include two bits): (i) do not monitor the paging PDCCH (e.g., the WTRU may be expected to determine that a system information modification and a etws/Cmas notification are not expected); (ii) the paging PDCCH includes paging scheduling information (e.g., so the WTRU may be expected to monitor the paging PDCCH to receive the scheduling information); (iii) do not monitor the paging PDCCH and there is a systemInfoModification, for example, indication of a BCCH modification other than SIB6, SIB7 and SIB8 (e.g., the WTRU may not monitor the paging PDCCH and may continue to receive the system info; or (iv) do not monitor paging PDCCH and there is a etwsAndCmasIndication, for example an indication of an ETWS primary notification and/or an ETWS secondary notification and/or a CMAS notification (e.g., the WTRU may not monitor the paging PDCCH and may continue to receive the notification). In examples, the information (e.g., the four bit information) indicated by the possible set of cyclic shifts may include part or all of the information as the short message (e.g., may be the same information as the short message).

A WTRU may monitor for at least one sequence (e.g., a first sequence) with a set of cyclic shift values. The set of cyclic shifts may include at least one cyclic shift value. Monitoring for a sequence may mean that the WTRU compares a received signal to the sequence (e.g., first sequence) e.g., by correlating the received signal with the first sequence and comparing the correlation value to a threshold. The WTRU may determine to monitor a paging PDCCH in an associated PO if the received signal is determined to be or include the first sequence.

In examples, the information (e.g., some or all of the information) that may be present in the short message of the paging PDCCH may be transmitted within the paging indication channel/signal. One or more of the following may apply.

The WTRU may monitor for more than one sequence (e.g., a first sequence and a second sequence). The sequences may be generated with a set (e.g., a distinct set) of cyclic shifts (e.g., a first sequence may be generated using a first set of cyclic shifts and a second sequence may be generated using a second set of cyclic shifts). If the received signal matches one of the sequences (e.g., the first sequence), the WTRU may perform one or more of the following: determine that there is a system information update scheduled, monitor the broadcast channel to receive the system information update, or determine not to monitor the paging PDCCH. If the received signal matches one of the sequences (e.g., the first sequence), the WTRU may determine that the systemInfoModification parameter is set to 1 and the WTRU may apply the SI acquisition procedure. If the received signal matches one of the other sequences (e.g., the second sequence), the WTRU may determine to monitor the associated paging PDCCH.

The WTRU may monitor for an additional sequence (e.g., a third sequence). If the received signal matches this sequence, the WTRU may determine that there is a notification (e.g., Earthquake and Tsunami Warning System (ETWS) notification and/or a Commercial Mobile Alert System (CMAS) notification) and the WTRU may monitor for the SIBs that may include information (e.g., more information) about these notifications (e.g., SIB6 and/or SIB7 and/or SIB8). If the received signal matches this sequence, the WTRU may not monitor the paging PDCCH.

The cyclic shift(s) of the sequence used to indicate to the WTRU the presence of a system information update may be fixed (e.g., in a specification) or may be indicated to the WTRU in a system information, e.g., in SIB1. If present, the cyclic shift(s) of the sequence used to indicate to the WTRU the presence of a notification may be fixed (e.g., in a specification) or may be indicated to the WTRU in a system information, e.g., in SIB1.

At least one of the cyclic shifts of the sequence used to indicate to the WTRU to monitor the associated paging PDCCH may be determined by the WTRU, e.g., using the WTRU ID.

A cyclic shift value (e.g., first cyclic shift value) may be a function of the WTRU ID and/or the WTRU group ID while a cyclic shift value (e.g., a second cyclic shift value) may be determined from the payload information, e.g., as presented in one or more of the above paragraphs (e.g., whether the WTRU may monitor an associated PO or not, etc.). In examples, the cyclic shift value (e.g., second cyclic shift value) may indicate to the WTRU a presence or non-presence of a configured reference signal where the configuration of the reference signal may be carried in the system information, e.g., in a SIB. In examples, a cyclic shift value (e.g., first cyclic shift value) may be determined as one of the following: (i) c=(WTRU_ID) mod Ng*floor(N/Ng); (ii) c=(floor (WTRU_ID/N)) mod Ng*floor(N/Ng); (iii) c=(floor (WTRU_ID/(N×Ns))) mod Ng*floor(N/Ng); or (iv) c=(floor (WTRU_ID/Ns)) mod Ng*floor(N/Ng), where T may be a DRX cycle of the WTRU. T may be determined by a WTRU specific DRX value(s) (e.g., the shortest of the WTRU specific DRX value(s)), if configured by RRC and/or upper layers. T may be determined by DRX value (e.g., a default DRX value) broadcast in system information. In RRC_IDLE state, if WTRU specific DRX is not configured by upper layers, the default value may be applied. N may be a number of total PFs in T. Ns may be a number of POs for a PF. A WTRU ID may be 5G-S-TMSI mod 1024. Ng may be the number of WTRU groups.

WTRUs may (e.g., in such a case) be grouped into Ng groups and a sequence (e.g., one sequence) may be intended and/or used for a group (e.g., one group). A WTRU may determine if the group index in the received sequence matches its own group index. The WTRU may (e.g., may also) determine the payload information and apply the indication in the payload if the received sequence matches its own group index. The WTRU may determine to monitor or not to monitor a PO. The payload information may indicate to the WTRU whether a configured reference signal (e.g., a CSI-RS, TRS, etc.) may be available for the WTRU to use, e.g., to make some measurements. The configuration of the reference signal may be present in the system information, e.g., in one of the SIBs. The number of WTRU groups may be indicated in the broadcast channel, e.g., in SIB1.

If the payload information is n bits, the WTRU may monitor for sequences (e.g., at least 2n sequences). These 2n sequences may be in addition to the sequences the WTRU may monitor to determine if there is a system information update or a notification. If the payload is 1 bit, the WTRU may monitor for at least two sequences. If the received signal matches one of the sequences, e.g., the first sequence, the WTRU may determine to monitor a paging PDCCH and may determine that a reference signal is present. If the received signal matches one of the other sequences, e.g., the second sequence, the WTRU may determine to monitor a paging PDCCH and may determine that a reference signal is not present. The $2^n$ sequences (e.g., each of the $2^n$ sequences) may be generated using a different set of cyclic shifts where a set of the cyclic shifts (e.g., each set of the cyclic shifts) may be at least a function of the WTRU ID and the payload information (e.g., if present). If the payload information is 0 bits, the WTRU may monitor for one sequence and the sequence may indicate to the WTRU to monitor a paging PDCCH.

The cyclic shift values (e.g., each of the cyclic shift values) of a sequence to monitor for may be determined as a function of at least the WTRU ID and/or the payload information. In examples, one cyclic shift value may be a function of the WTRU ID and another cyclic shift value may be a function of the payload information. If the payload information includes n bits, then a first cyclic shift value may be determined as one of the following:

$c\_first=(UE\_ID) \mathrm{mod} Ng*\mathrm{floor}(N/Ng)$ $c\_first=(\mathrm{floor}(UE\_ID/N)) \mathrm{mod} Ng*\mathrm{floor}(N/Ng)$ $c\_first=(\mathrm{floor}(UE\_ID/(N \times Ns))) \mathrm{mod} Ng*\mathrm{floor}(N/Ng)$ $c\_first=(\mathrm{floor}(UE\_ID/Ns)) \mathrm{mod} Ng*\mathrm{floor}(N/Ng)$ while the second cyclic shift may be determined as $c\_second=(\mathrm{payload\ value})*\mathrm{floor}(N/2n)$. In examples, the payload value may be 0 or 1 for $n=1$.

The WTRU may monitor for at least two sequences to determine whether to monitor a paging PDCCH or not. The WTRU may determine to monitor a paging PDCCH if a first sequence is detected. The WTRU may monitor for a second sequence to determine whether to monitor a paging PDCCH if the first sequence is not detected. The WTRU may determine to monitor a paging PDCCH if a first sequence is not detected but a second sequence is detected. The WTRU may monitor for a third sequence to determine whether to monitor a paging PDCCH if the first sequence and the second sequence are not detected. The WTRU may determine to monitor a paging PDCCH if a first and second sequence are not detected but a third sequence is detected. The WTRU may continue this procedure and determine not to monitor a paging PDCCH if none of the sequences are detected.

The WTRU may monitor for at least one paging indication channel/signal associated to a SSB. A paging indication signal (e.g., each paging indication) associated to a SSB may be present in more than one time unit, e.g., N OFDM symbols or N slots. The time location of some of the OFDM symbols, e.g., n OFDM symbols, may be fixed within the signal of N OFDM symbols and may be known to WTRUs (e.g., all WTRUs) monitoring the signal. The time location may be configured in the system information such as SIB1. The WTRUs may monitor the time location for the paging indication targeting WTRUs (e.g., all WTRUs), such as the SI update indication and/or ETWS/CMAS notification (e.g., the first n=1 OFDM symbol in a signal including N=4 OFDM symbols). The WTRU specific and/or WTRU group specific paging indication may be present in the remaining (N-n) symbols. The WTRU may determine the indices of the symbols to monitor from (N-n) symbols for the WTRU specific information using the WTRU ID.

Examples presented above in the context of cyclic shifts may be similarly applicable for other features of a sequence, e.g., phase shift, scrambling sequence, time/frequency location. The RE indices of sequences (e.g., certain sequences) may be fixed and known to WTRU(s) (e.g., all WTRUs) in the group and a WTRU may monitor these REs to determine an indication of a first type. The sequences on these REs may be monitored for an SI update and/or ETWS/CMAS indication. The WTRU may determine set (e.g., another set) of RE indices using the WTRU ID to monitor on these REs an indication of another type, for example WTRU specific or WTRU group specific paging indication (e.g., whether to monitor a paging PDCCH or not). The WTRU may determine the group index from a cyclic shift (e.g., first cyclic shift) determined from the received sequence and may determine the payload information from a cyclic shift (e.g., second cyclic shift) from the received sequence. The WTRU may process (e.g., further process) the information in the payload if the received group index matches to the index of the group the WTRU belongs to.

If there is a WTRU group (e.g., one WTRU group) per PO, then more than one cyclic shift value (e.g., both cyclic shift values) may be used to indicate a payload to the WTRU. The cyclic shift value (e.g., first cyclic shift value) may take a value (e.g., one of two values) to indicate whether a paging scheduling may be present in the associated paging PDCCH. The cyclic shift value (e.g., second cyclic shift value) may take a value (e.g., one of two values) to indicate whether a systemInfoModification and/or a etwsAndCmasIndication may be present in the associated paging PDCCH.

Cyclic shift values (e.g., both of two cyclic shift values) may be determined from the WTRU ID and/or the WTRU group index where values (e.g., each value) may be a function of a different part of the WTRU ID and/or the WTRU group index. In examples, assume that there are eight WTRU groups and the WTRUs (e.g., each WTRU) computes their group index as a function of their WTRU ID, for example as i=(WTRU_ID) mod Ng. If the group index is expressed in binary format, the y MSBs may be used to determine a cyclic shift value (e.g., one of the cyclic shift values) and the remaining bits may be used to determine the a cyclic shift value (e.g., the other cyclic shift value). If the group index is 011 (e.g., three), then bit 0 (e.g., y=1; one MSB) may determine a cyclic shift value (e.g., one of the cyclic shift values) and bits 11 (e.g., three) may determine a cyclic shift value (e.g., the other cyclic shift value). With one bit, the cyclic shift value (e.g., the first cyclic shift value) may take one of two values. With two bits, the cyclic shift value (e.g., second cyclic shift value) may take one of four values.

A WTRU or a group of WTRUs may determine to monitor the WUS (e.g., PI) in a set of OFDM symbols where the set includes at least one OFDM symbol. At least one of time resources to monitor (e.g, the OFDM symbol(s), the slot index, the SFN number, etc.) may be a function of the WTRU ID and/or the WTRU group index. A group of WTRUs (e.g., first group of WTRUs) may monitor the sequence in OFDM symbol 0. A group of WTRUs (e.g., second group of WTRUs) may monitor the sequence in OFDM symbol 1, etc.

The time location (e.g., the OFDM symbol index in a slot) may be a function of the WTRU ID group. In a set of OFDM symbols, WTRUs in group 0 may monitor symbol 0, WTRUs in group may monitor symbol 1, etc. The number of symbols in a set may be equal to the number of WTRU groups.

A phase shift and/or the cyclic shift of a WUS (e.g., a PI) may be a function of and/or may indicate a WTRU group ID or WTRU group ID/index. In examples, a WTRU may monitor a PO if a WUS with a phase shift (e.g., specific phase shift) (e.g., $$e^{\frac{j2\pi g3n}{N}}$$

is detected (e.g., where the phase shift parameter g may indicate the WTRU group ID). A WTRU may not monitor a PO if the WUS with the phase (e.g., specific phase) is not or cannot be detected.

A WTRU may use a phase shift to determine whether to monitor a PO. In examples, a WTRU may be configured with multiple (e.g., two) phase shift parameter values (e.g., g1 and g2). A WTRU may wake-up to monitor a PO if a WUS with a phase shift (e.g., $$e^{\frac{j2\pi g1n}{N}}$$

is detected and the WTRU may not wake-up to monitor a PO if a WUS with phase shift (e.g., e $$\frac{j2\pi g2n}{N}$$

is detected (or vice versa). A corresponding WTRU behavior (e.g., whether a WTRU monitors a PO or not) may be configured (e.g., to occur) if a WUS (e.g., with either phase shift) cannot be detected. In examples, a WTRU may be configured with g1 (e.g., with g1 only) and the other parameter g2 may be determined from the configured parameter (or vice versa).

A WUS sequence (e.g., PI sequence) may be mapped to a set of interleaved subcarriers (e.g., even or odd subcarriers) in a given bandwidth. A WTRU may determine bit information (e.g., a 1-bit information) depending on which subset of subcarriers a sequence is detected on. A WTRU may wake-up if a sequence on even subcarriers is detected and the WTRU may not wake-up if a sequence on odd subcarriers is detected.

A WTRU behavior may be determined by a combination of information carried in the scrambling sequence and the phase shift. In examples, a WTRU may monitor a PO if a sequence with scrambling $\theta_1$ and phase shift (e.g., e $$\frac{j2\pi g3n}{N}$$

is detected. The WTRU may not monitor a PO if a sequence with scrambling $\theta_2$ and phase shift (e.g., e $$\frac{j2\pi g3n}{N}$$

is detected. In examples, a WTRU may monitor a PO if a sequence with scrambling $\theta$ and phase shift (e.g., $$e^{\frac{j2\pi g1n}{N}}$$

is detected. The WTRU may not monitor a PO if a sequence with scrambling $\theta$ and phase shift (e.g., $$e^{\frac{j2\pi g2n}{N}}$$

is detected.

A WTRU may monitor or may be configured to monitor one or more (e.g., at least two) sequences within a WUS block (e.g., the same WUS block). A first sequence may indicate to WTRUs (e.g., all WTRUs) in the cell whether to monitor a PO. A WTRU may not (e.g., have to) monitor a second sequence if an indication (e.g., in a first sequence) is received. A WTRU may monitor a second sequence (e.g., to determine whether to monitor the associated PO) if an indication (e.g., in a first sequence) is not received. The second sequence may, for example, target one or more WTRUs (e.g., a group of WTRUs).

Multiple sequences may be used in conjunction (e.g., where two sequences may be used as an example). In examples, detection of a first sequence with a phase shift parameter g1 (e.g., g1=0) may indicate a WTRU should monitor a PO while a failure to detect the first sequence with a phase shift parameter g1 (e.g., g1=0) may indicate that a second sequence may indicate whether to monitor a PO. In examples, detection of a first sequence with a phase shift parameter g1 (e.g., g1=0) may indicate that a second sequence may indicate whether to monitor a PO while a failure to detect a first sequence with a phase shift parameter g1 (e.g., g1=0) may indicate the WTRU should monitor the PO. In examples, detection of a first sequence with a phase shift parameter g1 may indicate to a WTRU to monitor a PO while detection of a first sequence with a phase shift parameter g2 may indicate that a second sequence indicates whether to monitor a PO.

A WUS channel component (e.g., PDCCH based) may be supported. A WUS block (e.g., a PI) may have a channel component (e.g., a PDCCH based component). A PDCCH channel may have a DM-RS, which may be a function of one or more parameters. A DM-RS scrambling sequence may be determined from one or more of the below parameters. One or more (e.g., additional or other) parameters of a WUS block channel component may be determined from the one or more parameters. The one or more parameters may include at least one of the following: (i) a Cell ID; (ii) a WTRU ID and/or a WTRU group ID; (iii) a portion of a WTRU ID or a WTRU group ID (e.g., a number of LSB and/or MSB bits); (iv) a parameter determined by an index of an associated SSB (e.g., a WTRU may (e.g., may be expected to) monitor a WUS block (e.g., a PI) whose PDCCH DM-RS scrambling sequence may be generated, as a function of the index of the SS block associated with the WUS block (e.g., the PI), where the SSB and associated WUS block may have the same index if the SSB and WUS block association is one-to-one); (v) a parameter determined by the WUS block index; (vi) a function of the WUS block index and the associated SSB index; (vii) a parameter based on the time location of the associated SSB; (viii) a parameter based on the time location of the WUS burst that may include the WUS block; (ix) a parameter determined by an index of the WUS burst that may include the WUS block; (x) a parameter of the PO that may be associated with the WUS (e.g., the index of the first slot of the PO, the index of the first frame of the PO, etc.); (xi) the PO index (e.g., if the WUS block is associated with more than one PO); or (xii) a payload of k bits, such as a 1 bit information (e.g., $2^k$ different scrambling sequences may be generated for a payload of k bits, where a scrambling sequence (e.g., each scrambling sequence) may indicate the k bit payload, where a 1-bit information may indicate to the WTRU whether to monitor an associated PO, and where the payload indicated by the scrambling sequence may be combined by the WTRU with other information to determine a specific behavior).

A PDCCH payload may be used by a WTRU, for example, if the CRC of the PDCCH is scrambled with an RNTI (e.g., a specific RNTI). For example, at least one bit in the payload may indicate to the WTRU whether to monitor a PO.

A paging indication may be determined (e.g., by the WTRU), for example, by using (e.g., jointly) the WUS sequence (e.g., PI sequence) and the WUS channel (e.g., PI channel). A WTRU may monitor a WUS block (e.g., a PI). A WTRU may proceed to decoding the WUS PDCCH if a WUS sequence with a phase shift (e.g., specific phase shift) and/or a scrambling sequence (e.g., specific scrambling sequence) is detected. WUS PDCCH contents may indicate (e.g., may further indicate) to a WTRU whether to monitor a paging PDCCH. In examples, a DM-RS of a WUS PDCCH may indicate the WTRU group ID (e.g., alone or in conjunction with other parameters).

A WTRU may determine a paging indication from a WUS PDCCH (e.g., the paging indication channel). The paging indication (e.g., received in a WUS PDCCH transmission) may indicate to the WTRU whether to monitor a PO (e.g., at least one PO). Monitoring a PO may mean monitoring the paging PDCCH associated with the PO. In examples, the WTRU may determine the paging indication from a control information carried in the WUS PDCCH. In examples, (e.g., all or part of) the paging indication may be determined from the control information carried within the PDCCH.

The control information may (e.g., possibly in addition to other bits) include m×Ng bits (where m and/or Ng may be positive integers), and a WTRU may determine the paging indication to apply from m bits out of the m×Ng bits. The indices of the m bits may be determined by the WTRU, e.g., using at least a WTRU ID. In examples, the m×Ng bits may be grouped into Ng groups with i_g being the group index i_g=1, 2, . . . Ng. In examples, indexing using i_g=0, 1, . . . Ng−1 may be used A group (e.g., each group) may include m bits.

The group of m bits used to determine the paging indication, e.g., to be applied by a WTRU, may be determined by the WTRU using one or more of following:

$$i\_g=(UE\_ID) \bmod Ng^*, \text{ or}$$

$$i\_g=\text{floor}(UE\_ID/N) \bmod Ng, \text{ or}$$

$$i\_g=\text{floor}(UE\_ID/(N \times Ns)) \bmod Ng, \text{ or}$$

$$i\_g=\text{floor}(UE\_ID/Ns) \bmod Ng,$$

where T may be a DRX cycle of the WTRU. T may be determined by a WTRU specific DRX value(s) (e.g., the shortest of the WTRU specific DRX value(s)), if configured by RRC and/or upper layers. T may be determined by a DRX value (e.g., a default DRX value) broadcasted in system information. In RRC_IDLE state, if the WTRU specific DRX is not configured by upper layers, the default value may be applied. N may be a number of total PFs in T. Ns may be a number of POs for a PF. A WTRU_ID may be 5G-S-TMSI mod 1024.

In examples, an index of a paging indication bits set, i_g, may be determined from the of 5G-S-TMSI using the bits that are not used to determine a WTRU ID (e.g., the n most significant bits of 5G-S-TMSI mod $2^{10+n}$). The n bits may be mapped to a value for i_g. In examples, if n=2 bits, bits 00 may indicate i_g=1, bits 01 may indicate i_g=2, bits 10 may indicate i_g=3, and bits 11 may indicate i_g=4.

In examples, if m=1 and Ng=4, a WTRU may determine a paging indication using 1 bit out of the 4 bits. The 1 bit may indicate to the WTRU to monitor a corresponding PO (e.g., if the bit is set to 1), and the 1 bit may indicate to the WTRU not to monitor a corresponding PO (e.g., if the bit is set to 0). The paging indication may indicate information by using more than 1 bit per WTRU. The WTRU may be indicated (e.g., receive) 2 bits, e.g., where the below 2 bit indications are provided as examples. Other bit fields may be used to indicate mappings.

00 may indicate to a WTRU not to monitor paging PDCCH. In this case, the WTRU may (e.g., may be expected to) determine that a system information modification and/or a etws/Cmas notification are not expected.

01 may indicate that paging PDCCH includes paging scheduling information. A WTRU may be expected to monitor the paging PDCCH and receive the scheduling information.

10 may indicate to a WTRU not to monitor paging PDCCH. The bits 10 may indicate that there is a systemInfoModification, for example an indication of a BCCH modification other than SIB6, SIB7 and SIB8. In this case, the WTRU may not monitor the paging PDCCH and/or may continue to receive the system information.

11 may indicate to a WTRU not to monitor paging PDCCH (e.g., skip a monitoring for a paging PDCCH transmission). The bits 11 may indicate that there is a etwsAndCmasIndication, for example an indication of an ETWS primary notification, an ETWS secondary notification, and/or a CMAS notification. In this case, the WTRU may not monitor the paging PDCCH and/or may continue to receive the notification.

In examples, 00 may indicate to a WTRU not to monitor paging PDCCH. 01 may indicate that paging PDCCH includes paging scheduling information. 10 may indicate to the WTRU to monitor paging PDCCH, and the paging PDCCH may not include paging scheduling information. 11 may be reserved.

Figures 4, 5:
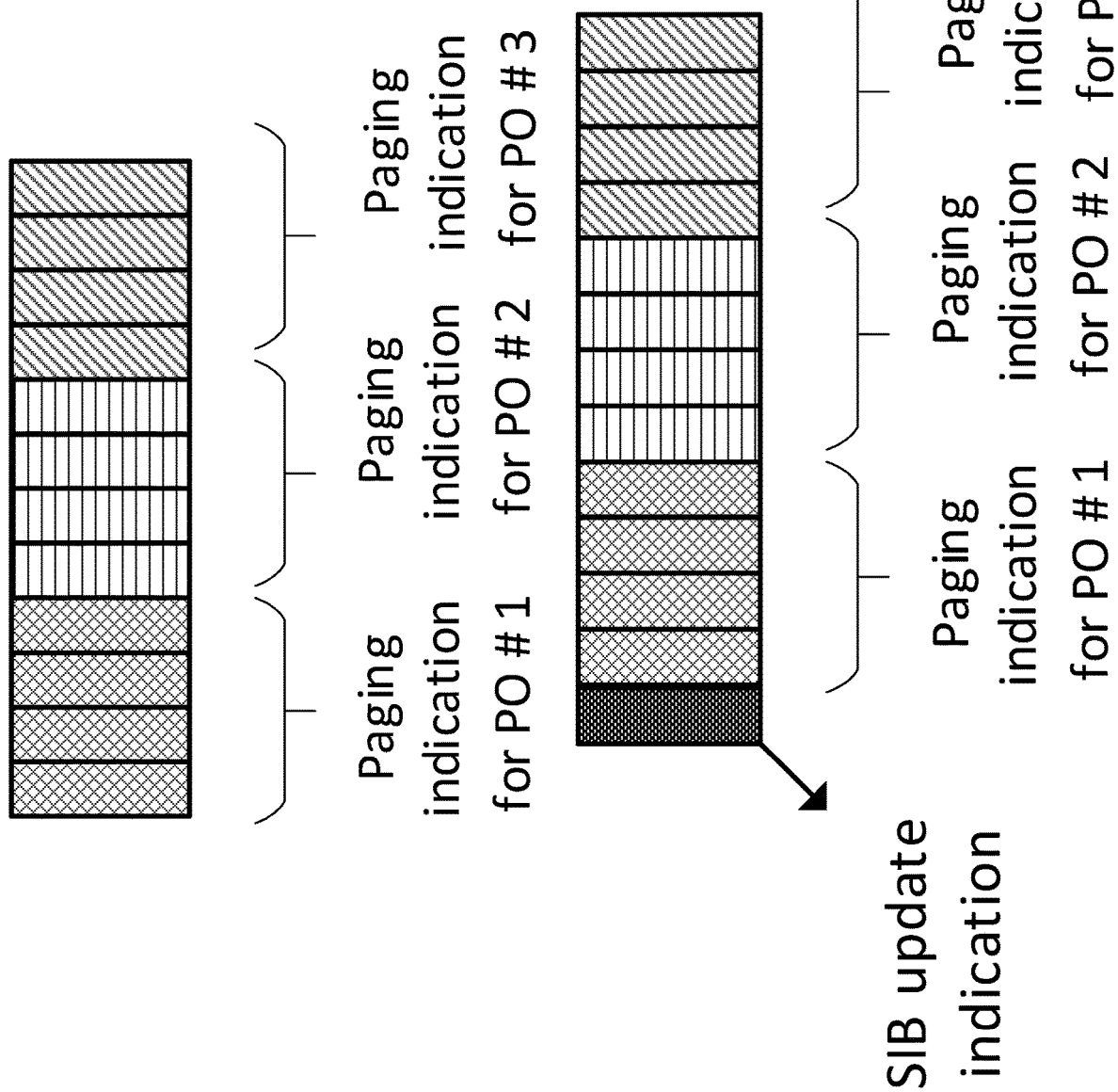
FIG. 4 illustrates an example paging indications for paging occasions (POs).
FIG. 5 illustrates an example of a system information block (SIB) update indication.

In examples, the control information may include m×Ng×Ns bits, where a separate set of m×Ng bits may be used to indicate whether to monitor an associated PO or not. As shown in FIG. 4, 4 bits (e.g., m=1, Ng=4) may be used as a paging indication for a PO (e.g., one PO out of 3 POs). A WTRU may determine an index of the PO, i_s, to monitor for possible paging. From the PO index, the WTRU may determine the set of m×Ng bits out of m×Ng×Ns bits by using (Ls−1)×(m×Ng)+1: i_s×(m×Ng), i_s=1, ..., Ns. A WTRU may find the paging indication in bits 1 to 4 if i_s=1; in bits 5 to 8 if i_s=2; and/or in bits 9 to 12 if i_s=3. The specific bits to monitor out of the set of m×Ng bits may be determined by using examples described herein. The PO index to which the paging indication is associated with may be determined from the RNTI of the paging indication channel.

The paging indication may include more than one type of indication. One type of indication (e.g., a first indication) may target a group of WTRUs and another type of indication (e.g., a second indication) may target one or more WTRUs (e.g., all WTRUs) monitoring a specific PO and/or one or more WTRUs (e.g., all WTRUs) monitoring the paging indication channel. A type (e.g., one type) of the indication may indicate whether to monitor a paging PDCCH (e.g., wherein monitoring a paging PDCCH herein may refer to monitoring a paging PDCCH transmission throughout the disclosure) as described herein. A type (e.g., another type) of indication may indicate whether a system information broadcast (e.g., a SIB update) is scheduled by a network (e.g., a gNB) and/or that the broadcast may be (e.g., may need to be) received by a WTRU. A common PI may carry a SIB update and/or a ETWS/CMAS modification. A WTRU-specific PI may carry PO information (e.g., whether or not to monitor the PO information).

FIG. 5 illustrates an example of a SIB update indication. An example is shown in FIG. 5 where a SIB update indication may be 1 bit.

In examples, a WTRU may determine that a SIB update indication indicates a SIB update and a paging indication indicates not to monitor the paging PDCCH. The WTRU (e.g., in this case) may skip monitoring the paging PDCCH and continue reception of the associated SIB(s).

In examples, a WTRU may determine that a SIB update indication indicates a SIB update and a paging indication indicates to monitor the paging PDCCH. The WTRU (e.g., in this case) may monitor the paging PDCCH and may continue reception of the associated SIB(s).

In examples, a WTRU may determine that a SIB update indication does not indicate a SIB update and a paging indication indicates not to monitor the paging PDCCH. The WTRU (e.g., in this case) may enter and/or stay in sleep mode, e.g., to save power.

In examples, a WTRU may determine that a SIB update indication does not indicate a SIB update and a paging indication indicates to monitor the paging PDCCH. The WTRU (e.g., in this case) may monitor the paging PDCCH.

A system information broadcast indication may include more than one bit (and/or may include more than one indication). A system information broadcast indication may include a systemInfoModification indication (e.g., using 1 bit) and/or a etwsAndCmasIndication (e.g., using 1 bit). From the one or more indications described herein, a WTRU may determine whether a system information modification and/or a ETWS/CMAS notification are to be expected. The system information broadcast indication may include a short message and/or a part of the short message (e.g., the first 2 bits of the short message or the first 3 bits of the short message). The short message may be the short message scheduled to be transmitted in the paging PDCCH of the associated PO. If there is more than one associated PO, there may be multiple short messages, one for each associated PO.

n bits may be allocated out of the N-bit DCI for the first type of indication. The indices of the bitfields within the paging indication DCI that are monitored for a first type indication (e.g., a SI update and/or ETWS/CMAS notification) may be fixed and may be known to WTRUs (e.g., all WTRUs) in the group. For example, the first and second bits in a DCI of 12 bits may be used. The indices of these n bits may be configured in the system information such as SIB1. The remaining bits may be indexed from 0 to (N−n−1) and each WTRU may determine from these bits which one(s) to monitor to determine a second type of indication such as the WTRU specific paging indication. This determination may be based on WTRU ID as described herein and/or some other WTRU-specific information.

Indices of the bitfields within the DCI corresponding to different types of indication may be computed using different IDs. In examples, the indices of the bitfields carrying the SI update and/or ETWS/CMAS may be calculated using a cell ID while the indices of the bitfields carrying WTRU or WTRU group specific paging indications may be calculated using the WTRU ID. The WTRU ID may be replaced with the appropriate ID, e.g., the cell ID.

Although the one or more examples described herein may have been presented in the context of a paging indication channel (e.g., PDCCH based), examples may apply to other forms of indications, e.g., sequence based and/or a combination. In examples, a PDCCH based indication channel may include a part or all of the short message (e.g., the first 2 bits) and/or may indicate whether a system information update is to be expected while the sequence based WUS (e.g., sequence based PI) may carry and the indication for the paging PDCCH (e.g., to indicate whether to monitor the paging PDCCH or not).

An example for a common PI and a WTRU group-specific PI is shown in FIG. 7B. A WTRU may monitor the PI (e.g., the common PI and the WTRU group-specific PI) within a PI monitoring window. A monitoring occasion of the common PI may be determined by the WTRU using cell-specific information. The WTRU may determine the index of at least one bit within a control information where the bitfield indicated by the bit indices may include the common PI (e.g., in addition to determining the monitoring occasion of the common PI). The WTRU may determine the index of at least one sequence to monitor for the common PI (e.g., in addition to determining the monitoring occasion of the common PI). The monitoring occasion of the WTRU group-specific PI may be determined by the WTRU using at least WTRU group-specific information. The WTRU may determine the index of at least one bit within a control information where the bitfield indicated by the bit indices may include the WTRU group-specific PI (e.g., in addition to determining the monitoring occasion of the WTRU group-specific PI).

The monitoring occasion of the common PI may be determined by the WTRU using cell-specific information. The WTRU may determine the index of at least one sequence to monitor for the WTRU group-specific PI (e.g., in addition to determining the monitoring occasion of the common PI). If the WTRU determines that the common PI indicates to wake-up but the WTRU group-specific PI does not indicate to wake up, the WTRU may not monitor the associated paging PDCCH and may receive the system information indicated by the common PI. If the WTRU determines that the WTRU-specific PI indicates to monitor the associated paging PDCCH, the WTRU may monitor the associated paging PDCCH.

The monitoring occasion of the WTRU group-specific PI may be determined by the WTRU using at least WTRU group-specific information.

A WUS search space may be specified, defined, and/or configured. A search space may indicate to a WTRU (e.g., among others) the monitoring occasions of a WUS signal/channel. A WUS search space may indicate to a WTRU one or more of the following: a periodicity of the monitoring occasions, a duration of the monitoring occasions, a time window during which the monitoring may be performed, or the frequency resources to monitor, etc. A WTRU may (e.g., in each monitoring occasion) monitor a WUS block (e.g., a PI), where a WUS block (e.g., PI) may have a sequence and/or a channel component. A WTRU may be indicated (e.g., receive an indication and/or configuration information) to start monitoring a WUS block every k OFDM symbols. A duration of a monitoring occasion may be one or more of (e.g., 1, 2, . . . k−1) OFDM symbols.

Figure 6:
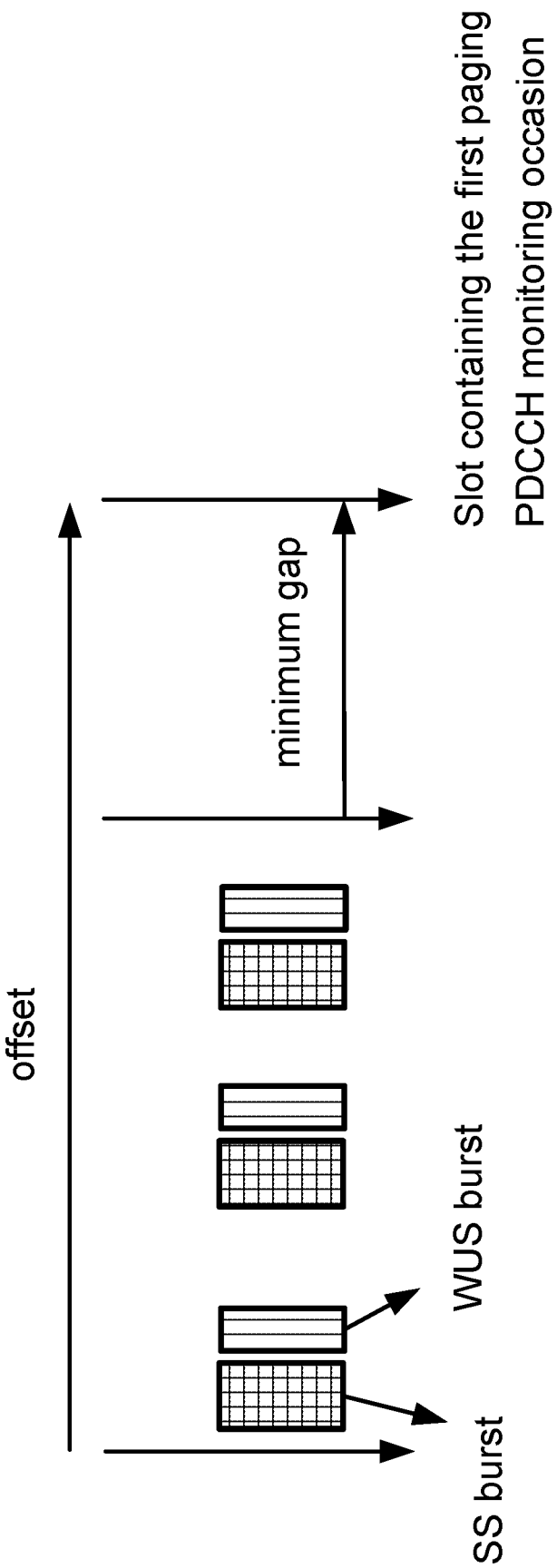
FIG. 6 illustrates an example of a wake up signal (WUS) block monitoring occasion.
Figure 7A:
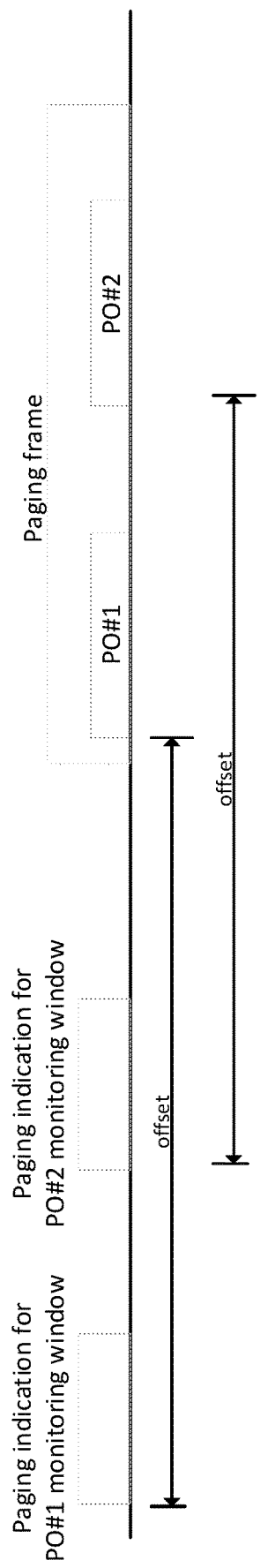
FIG. 7A illustrates an example of a time interval defined in relation to a PO.
Figure 7B:
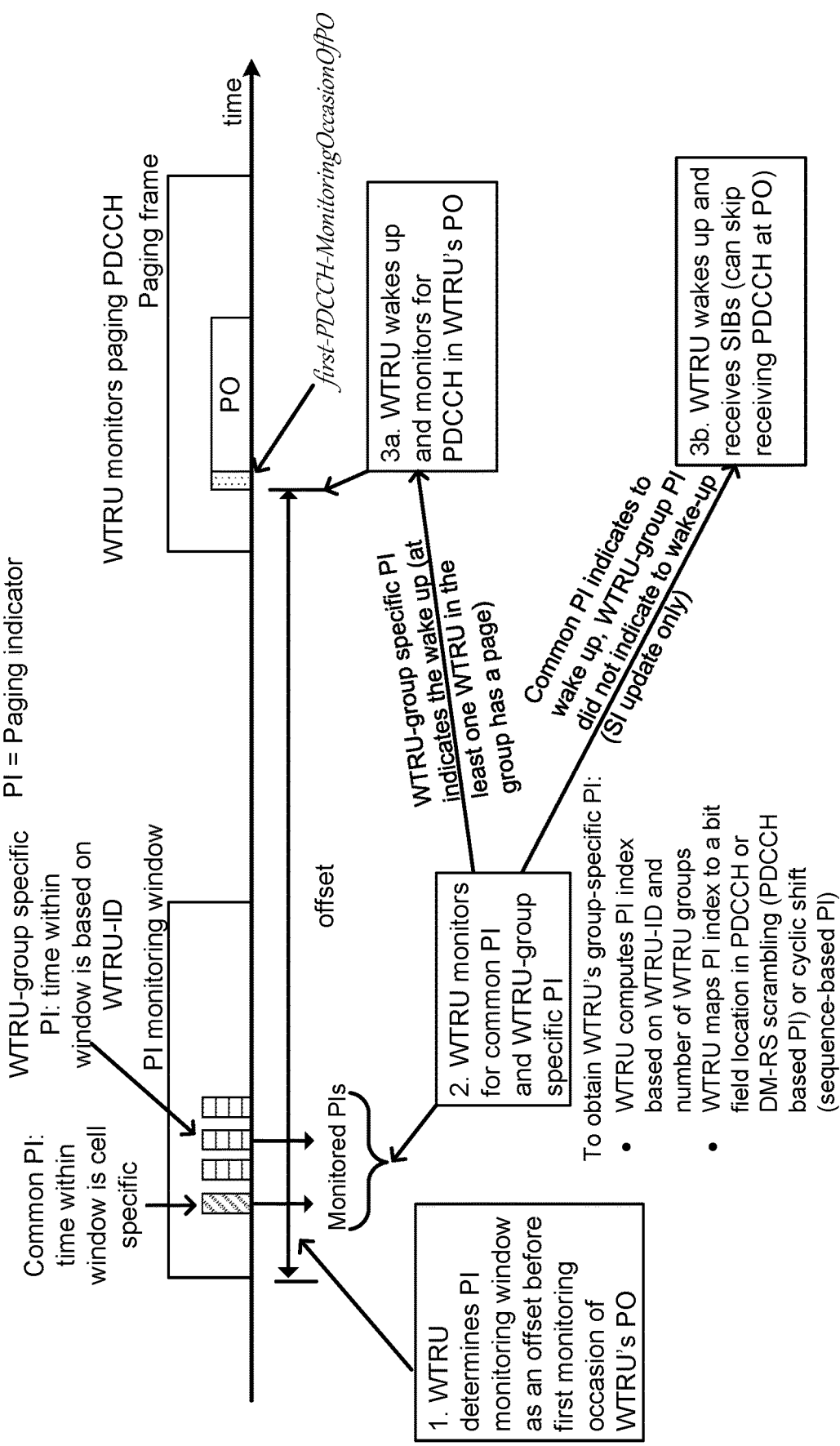
FIG. 7B illustrates an example of a time interval where paging indicator(s) (PI(s)) may be monitored for in the time interval.

A time interval (e.g., a time window/PI monitoring window as shown in FIG. 6, FIG. 7A, and FIG. 7B) may be defined in relation to a PO. FIG. 7A illustrates an example of a time interval (e.g., timing window/PI monitoring window) defined in relation to a PO. FIG. 7B illustrates an example of a time interval (e.g., timing window/PI monitoring window) where PI(s) may be monitored for in the time interval (e.g., a common PI and a WTRU group-specific PI). The time interval may be defined in relation to a monitoring occasion (e.g., a first PDCCH monitoring occasion). For example, a timing window (e.g., such as the PI monitoring window in FIGS. 7A and/or FIG. 7B) may start or may be configured to start at slot (k−offset) and finish at (k−minimum gap), where k may be the slot including the firstPDCCH-MonitoringOccasionOfPO, and where an offset and minimum gap may be values configured in slots, OFDM symbols, subframe, or in absolute time. The time offset (e.g., indicating when to start monitoring) may be with respect to one or more of the following: a PO (e.g., as shown in FIG. 7A and FIG. 7B), a paging monitoring occasion, a DRX ON duration start time (e.g., for the PO or paging monitoring occasion), or a PF starting slot and/or starting symbol, or the first or the last symbol (or slot) of a SSB burst.

FIG. 6 is a diagram illustrating an example of a WUS block monitoring occasion. FIG. 6 shows one of many examples of multiplexing WUS and associated SSB bursts. As shown in FIGS. 6 and 7A-7B, WUS blocks/bursts may be monitored or may be configured to be monitored within a timing window (e.g., where the timing window/PI monitoring window is the offset−minimum gap in FIG. 6). For example, there may be more than one WUS burst (e.g., PI) following a SS burst. A WTRU may monitor or be configured to monitor one or more (e.g., a subset of) WUS blocks (e.g., PIs) (e.g., 1 SS block or a number of blocks, such as 2 or 4 blocks). There may be one or more WUS bursts (e.g., PIs) within a timing window/PI monitoring window. For example, as shown in FIG. 7B, there may be a common PI and a WTRU group-specific PI within the timing window/PI monitoring window. A WTRU may determine which burst to monitor for the WTRU's WUS block (e.g., PI) based on at least one of the following: WTRU ID, WTRU group ID, a number of WTRU groups, a portion of WTRU ID or WTRU group ID (e.g., a number of LSBs and/or MSBs).

A WTRU may (e.g., if there is more than one WUS burst/PI within a timing window) monitor or may be configured to monitor one or more of the bursts (e.g., the first burst or the last burst or a consecutive number of multiple bursts). One or more restrictions may apply. A WTRU may not monitor a WUS burst (e.g., PI), for example, if any monitoring occasion of a WUS block of a WUS burst falls in a timing window/PI monitoring window (e.g., k−minimum gap). A WTRU may stop monitoring the remaining WUS blocks/bursts, for example, if an indication is detected. Monitoring multiple WUS bursts (e.g., PIs) may be limited, for example, to operation in shared spectrum or in a special mode (e.g., a coverage enhanced mode). There may be a limit on the maximum number of bursts to monitor.

A frequency location where a WTRU is to monitor a WUS signal/channel or a portion of the WUS signal/channel (e.g., a sequence component) may be determined from the subcarrier allocation of the SS block. A WUS sequence component may be mapped to subcarriers allocated to the PSS and SSS or a subset of those subcarriers (e.g., in different OFDM symbols).

A CORESET of a WUS signal/channel may be the same CORESET the paging search space is configured with or CORESET zero. The CORESET and/or the frequency location of the WUS to monitor may be a function of a WTRU ID (e.g., or a portion of a WTRU ID) and/or a WTRU group ID (e.g., or a portion of a WTRU group ID). A WTRU group ID may indicate a frequency offset value with respect to a parameter of CORESET zero (e.g., first subcarrier), the initial BWP (e.g., subcarrier), or the PSS/SSS (e.g., first subcarrier, ssb-subcarrieroffset). The search space to monitor for the WUS may be a function of a WTRU ID (e.g., or a portion of a WTRU ID) and/or a WTRU group ID (e.g., or a portion of a WTRU group ID).

A sub-time-unit (STU) based paging indication may be provided (e.g., supported). A paging indication (PI) may be transmitted or received with one or more sub-time-units, which may be transmitted within a time unit (e.g., an OFDM symbol or a DFT-s-OFDM symbol). PI may be used interchangeably with wake up signal (WUS), paging wake up signal (P-WUS), idle mode wake up signal (I-WUS), wake up signal for paging, paging monitoring indicator (PMI), and paging PDCCH monitoring indicator (PPMI).

A sub-time unit (STU) may be a smaller time unit than a time unit (TU), where one or more STUs may be transmitted, received, or monitored within a TU. A TU may be a symbol (e.g., an OFDM symbol or a DFT-s-OFDM symbol), a TU may be a set of symbols and an STU may be a symbol, and/or a TU may be one or more slots and an STU may be a set of symbols.

A STU based paging indication may be used. An STU may be determined, used, configured, or defined in accordance with one or more of the following.

One or more STUs may be used, configured, or determined within an OFDM symbol or DFT-s-OFDM symbol. The number of STUs within an OFDM symbol or DFT-s-OFDM may be referred to as Nstu. A symbol may be used interchangeably with OFDM symbol, DFT-s-OFDM symbol, or other waveform based symbols. A maximum Nstu may be determined based on the subcarrier spacing. In examples, a maximum number of Nstu may be smaller for a higher subcarrier spacing. Nstu may be configured or determined based on the number of SSBs (e.g., or actually transmitted SSBs) in a cell. An STU may correspond with a chunk of a reference signal as an input of a transform precoder. An output of the transform precoder of the chunk of reference signal may be an STU. A set of reference signal chunks may be used as an input of transform precoder for the set of STUs. The transform precoder may be a DFT transform precoder for DFT-s-OFDM symbol generation. A set of STUs may be generated based on an interlaced reference signal in the frequency domain (e.g., without data in the REs in the RE not containing reference signal). One or more STUs may be in the time domain.

A STU (e.g., each STU) may be associated with a beam. STUs (e.g., all STUs) in a symbol may be associated with the same beam. A STU (e.g., each STU) in a symbol may be associated with a different beam. In examples, a STU (e.g., each STU) may be associated with an SSB (e.g., or an SSB index). The SSB index may determine the beam to use to receive an STU.

Figure 8:
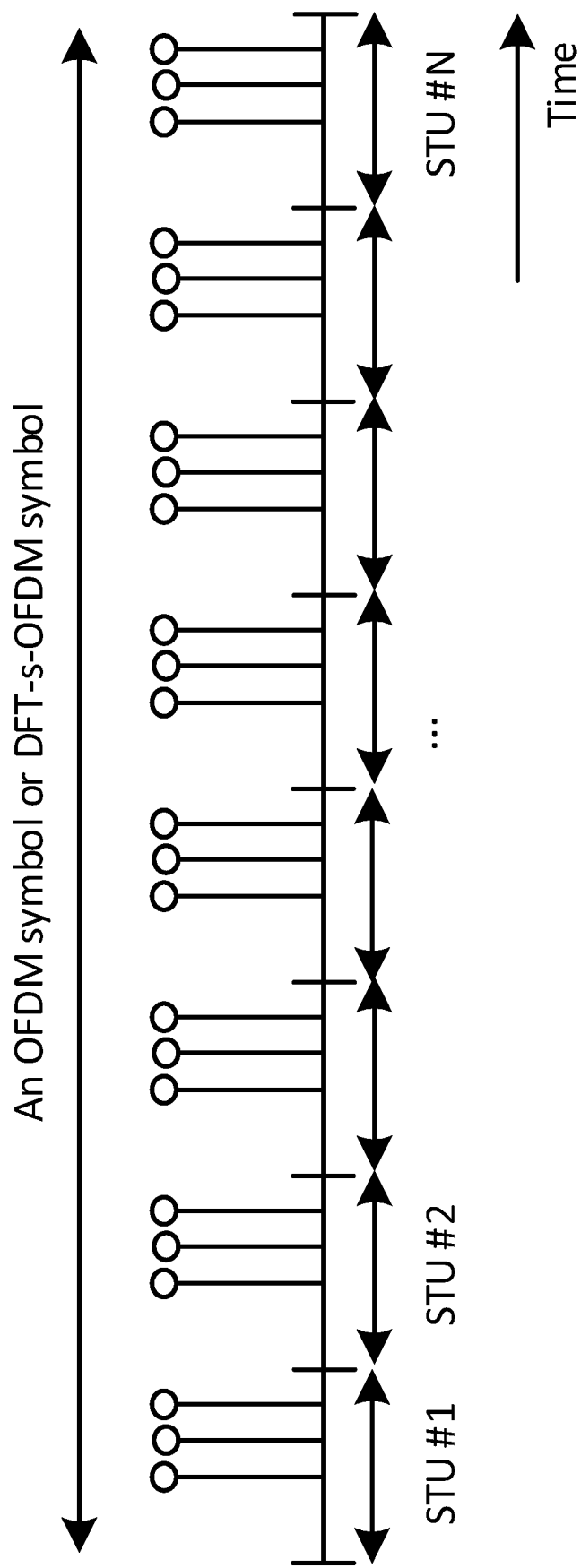
FIG. 8 illustrates an example of sub-time units in an OFDM symbol or a DFT-s-OFDM symbol.
Figure 9:
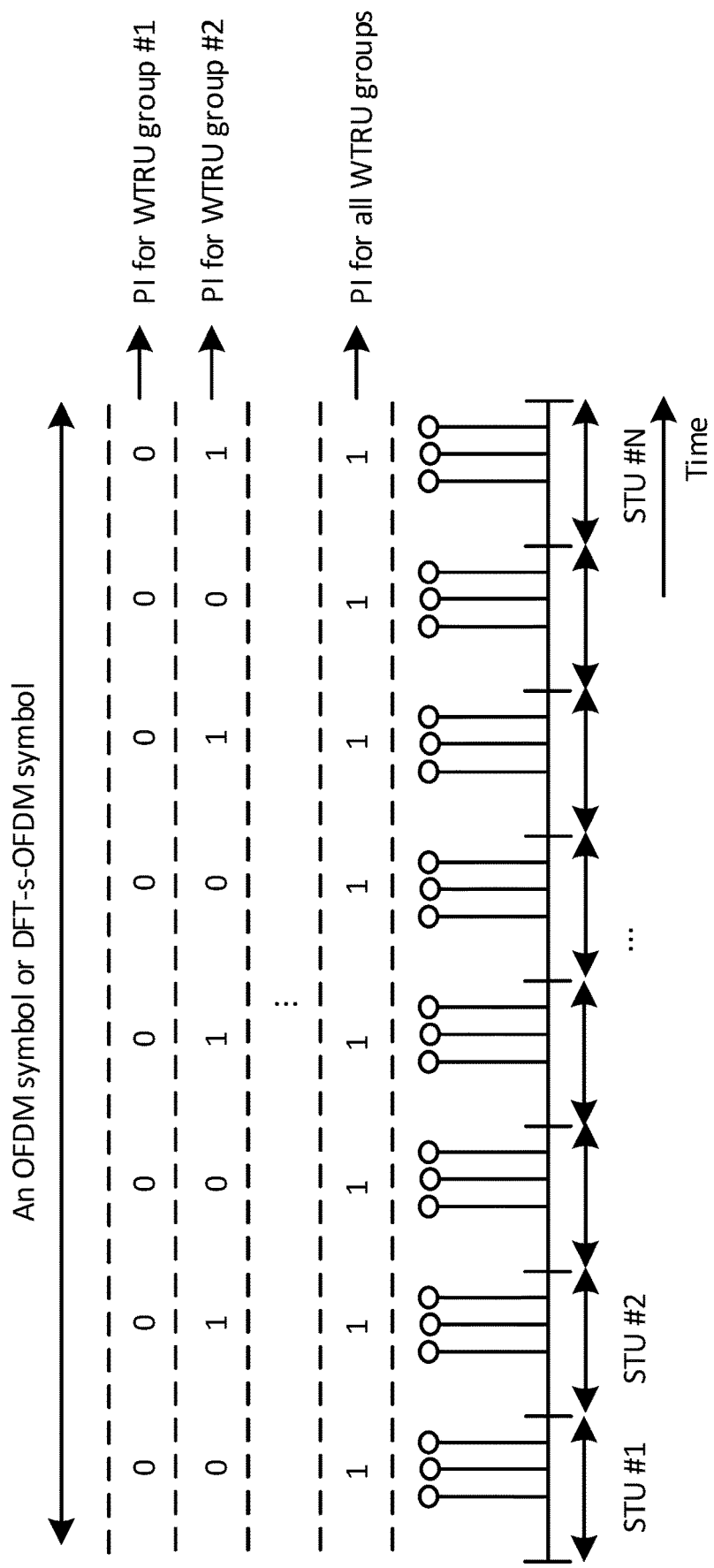
FIG. 9 illustrates an example of a paging indication (PI) transmission with a set of sub-time-units (STUs) in a symbol.

FIG. 8 is a diagram illustrating an example of sub-time units in an OFDM symbol or a DFT-s-OFDM symbol. A WTRU may determine or receive information based on information carried in the set of STUs within one or more symbols. In examples, a WTRU may receive N STUs in a symbol. The N STUs may carry N bit information. A STU (e.g., each STU) may carry one or more information bits (e.g., '0' or '1'), for example, as shown in FIG. 9. One or more of following may apply. A STU (e.g., each STU) may carry a sequence (e.g., short sequence), which may indicate a subset of information bits for a paging indication. In examples, a first sequence transmitted in an STU may be considered as '0' while a second sequence transmitted in an STU may be considered as '1.' N×M information bits may determine the paging indication, for example, if N STUs are used in a symbol and a STU (e.g., each STU) carries M bit(s). N×M information bits may be referred to as an information bit sequence. An information bit sequence may indicate one or more of the following: a paging indication for a WTRU group, a paging indication of a subset of WTRU groups, no WTRU group to monitor paging, or all WTRU groups to monitor or receive paging. The set of WTRU groups associated with an information bit sequence may be determined based on, for example, one or more of following: a higher layer configuration; a PDCCH monitoring occasion configuration; P-RNTI (e.g., determined); a DRX configuration; and/or SSB-index (e.g., determined or associated with). A STU (e.g., each STU) may carry a modulation symbol, which may indicate one or more information bits (e.g., BPSK, QPSK, etc.). A STU (e.g., each STU) may include or may not include a signal, which may determine the information bits (e.g., on-off keying).

FIG. 9 is a diagram illustrating an example of a PI transmission with a set of STUs in a symbol. In examples, a STU (e.g., each STU) may be associated with one or more WTRU groups. Associated WTRU groups may monitor or receive associated PO(s), if a signal is received in an STU.

FIG. 10 is a diagram illustrating an example of an association between STU and WTRU groups for a PI. FIG. 10 shows an example of an association between STU and WTRU groups for a paging indication. One or more of following may apply. A WTRU or WTRU group may be configured with an associated STU or STU index within a TU. A WTRU or WTRU group may attempt to decode PDCCH monitoring occasions or POs associated with a PI, if the WTRU or WTRU group received a PI in an associated STU. A sequence may be transmitted or received in an STU. The sequence may carry one or more information bits, e.g., for a paging indication.

One or more STUs in a TU may carry the same information or payload, but a STU (e.g., each STU) may be associated with a different beam. In examples, multiple (e.g., all) STUs may carry the same information bits, which may indicate one or more WTRU groups for PI while a STU (e.g., each STU) may be associated with a different SSB-index. An SSB-index may determine a beam for the reception of STUs. A WTRU may determine a preferred beam for PI reception and may receive and/or monitor PI in an STU, e.g., which may be associated with the determined beam. A preferred beam may be determined based on a measurement of SSBs. In examples, a WTRU may determine the preferred beam that has the highest measurement results within the SSBs. A measurement may be, for example, at least one of the following: L1-RSRP, L1 signal-to-interference-plus-noise ratio (L1-SINR), and L3 filtered RSRP. A WTRU may determine a set of preferred beams for PI reception. The WTRU may receive, monitor, and/or combine PIs received in the set of STUs, e.g., which may be associated with the set of preferred beams for PI reception. The set of preferred beams may be determined, for example, based on the measurement of SSBs. An SSB may be determined as a preferred beam, if the measurement of SSB is higher than a threshold.

A time location of a paging indication relative to SSBs may be provided (e.g., supported). The time location of a WUS block (e.g., and the occasion where the WUS block is monitored by the WTRU) may be determined from a timing relationship with an associated SS block and/or the SS burst containing the SS block.

Figure 11:
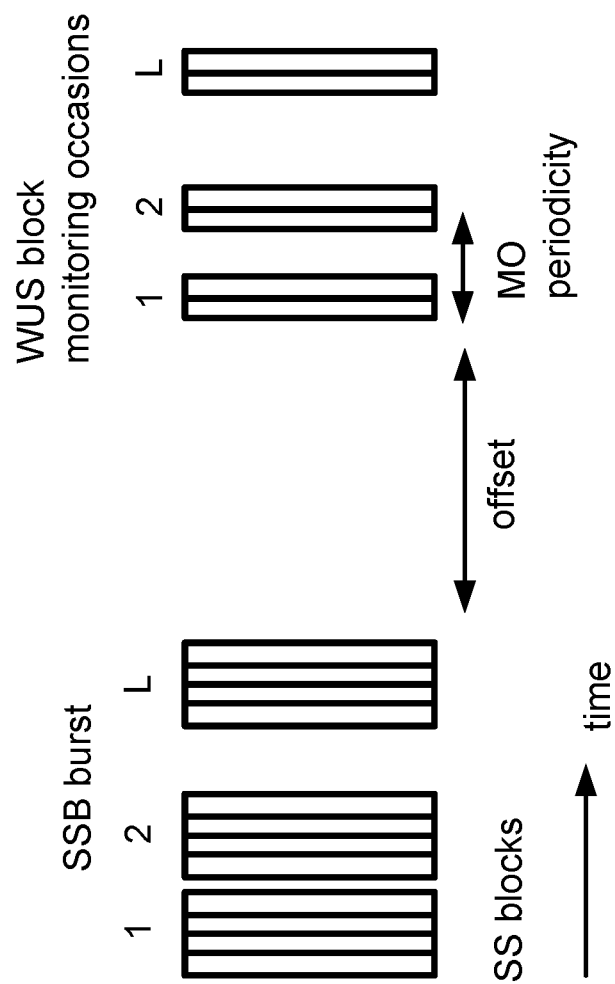
FIG. 11 illustrates an example of a WUS burst offset relative to an SS burst.

FIG. 11 is a diagram illustrating an example of a WUS burst offset relative to an SS burst. A WUS burst may be monitored with a time offset with respect to the associated WUS burst, e.g., as shown by example in FIG. 11. There may be (e.g., as shown by example in FIG. 11) L SS blocks in an SS burst and L corresponding WUS blocks in a WUS burst. The first WUS block may be associated with the first SS block, the second WUS block may be associated with the second SS block, etc. A SS block may include one or more (e.g., four) OFDM symbols while a WUS block may include one or more (e.g., two) OFDM symbols, e.g., as shown in FIG. 11. A WUS block may indicate (e.g., may also indicate) the monitoring occasion of the WUS block.

There may an offset between an OFDM symbol (e.g., the last OFDM symbol) and/or slot of an SS burst and another OFDM symbol (e.g., the first OFDM symbol) and/or slot of the WUS burst and/or the WUS monitoring occasion. An offset may be a configurable value (e.g., in ms, slots, OFDM symbols, etc.). An offset may be zero, which may mean, for example, that the first slot/OFDM symbol of the WUS burst is k+1, where k is the last slot/OFDM symbol of the SS burst (e.g., unless k+1 is invalid, for example, if it is a UL symbol). A WTRU may start monitoring (e.g., may be expected to start monitoring) the WUS blocks after a time offset.

Figure 12:
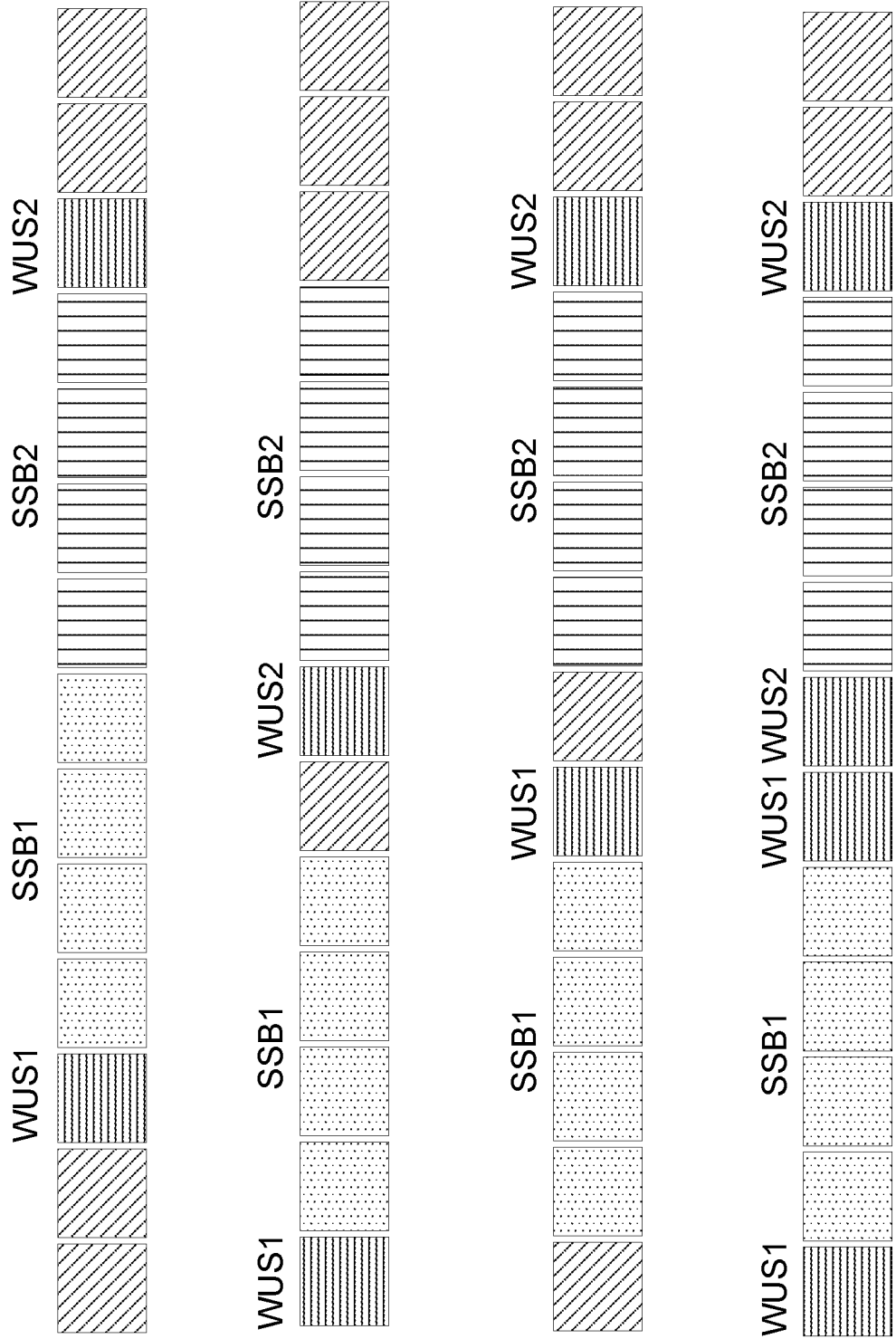
FIG. 12 illustrates an example of WUS and SSB multiplexing.

FIG. 12 is a diagram illustrating an example of WUS and SSB multiplexing. WUS blocks and associated SS blocks may be transmitted within the same SS burst. WUS blocks may be transmitted between SS blocks, e.g., as shown by example in FIG. 12. A square (e.g., each square) may represent (e.g., as shown by example in FIG. 12) an OFDM symbol in a slot. In examples, there may be 14 OFDM symbols in a slot. WUS1 may be associated with SSB1 and WUS2 may be associated with SSB2. SSBs may be transmitted in varying patterns. For example, multiple (e.g., two consecutive) SSBs may be transmitted with no spacing (e.g., no OFDM symbol) between them or with spacing between them. Associated WUSs may be placed between SSBs and/or around SSBs, depending on the spacing between the (e.g., two consecutive) SSBs. An associated WUS may not be transmitted if an SSB the WUS is associated with is not transmitted. A WTRU may monitor (e.g., may be expected to monitor) WUS blocks in OFDM symbols where the WUS blocks are transmitted (e.g., WUS blocks may indicate WUS block monitoring occasions, for example, as shown in FIG. 11).

In examples, a WTRU may determine from a number of bits (e.g., 1 bit) in the MIB whether the WTRU may (e.g., be configured to) monitor a WUS signal/channel.

An association between the SS blocks and the WUS blocks may be 1:1, which means that for a transmitted SS block (e.g., each transmitted SS block), a WUS block may be expected (e.g., unless the WUS resource is invalid). In examples, a WUS block may be associated with more than one SS block. In examples, more than one WUS block may be associated with one SS block.

A WTRU may monitor or may be configured to monitor M*N WUS consecutive monitoring occasions, where N may be the number of SS blocks. N may be the number of transmitted SS blocks, which may be less than the maximum number of SS blocks. In examples, the WUS block monitoring occasions (e.g., {(n−1)*M+1 to nM}) may be associated with SS block n, and n=1, . . . , N. In examples, WUS block monitoring occasions n, M+n, 2M+n, . . . kM+1 may be associated with SS block n.

The paging indication channel/signal may be multiplexed with the SSB and/or the RMSI PDCCH/PDSCH. The WTRU may determine the time/frequency location of the paging indication channel/signal and the SCS of the paging indication channel/signal from at least one of the SSB/RMSI multiplexing pattern, the SCS used for the SSB, or the RMSI. The SCS of the paging indication may be selected as to reduce the interference between the paging indication and the SSB of the same and/or interfering cells.

In examples, at least one of the following may apply: (i) the SCS of the paging indication may be determined to be the same as the SCS of the RMSI PDCCH and/or RMSI PDSCH; (ii) the SCS of the paging indication may be determined as the smallest SCS of the respective frequency band (e.g., 15 kHz in FR1 or 60 kHz in FR2 as described herein); or (iii) the SCS of the paging indication may be determined to be the same as the SCS of the paging PDCCH and/or the paging PDSCH.

Figure 13:
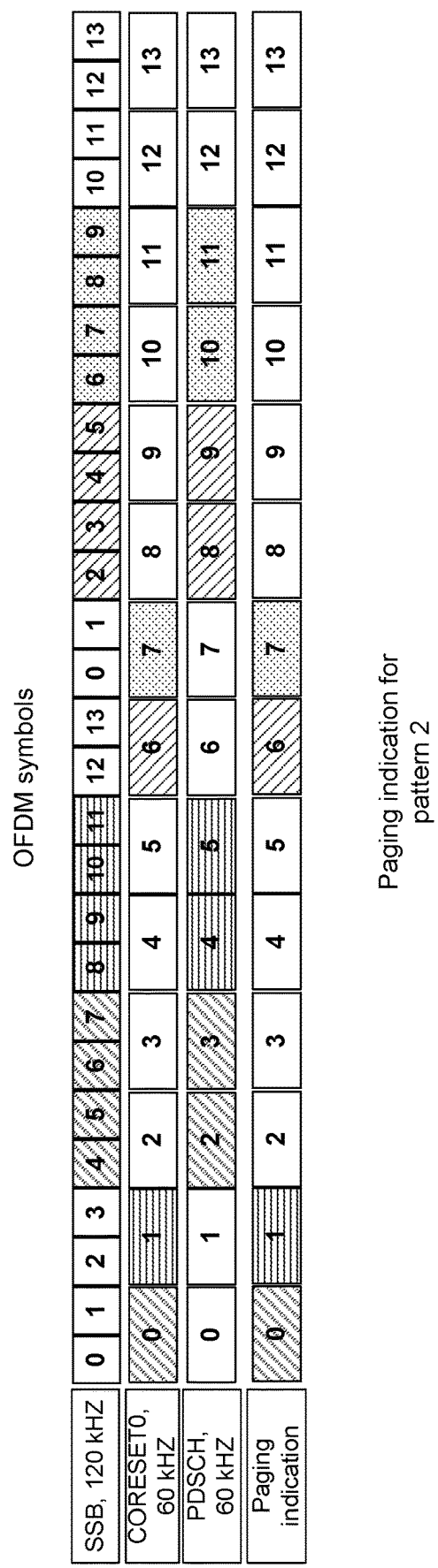
FIG. 13 shows an example of a paging indication multiplexing sample for pattern 2.

FIG. 13 shows an example of a paging indication multiplexing sample for pattern 2. In pattern 2 illustrated in FIG. 13, the SCS of the paging indication may be determined to be 60 kHz. The same SCS as the RMSI PDCCH/PDSCH and the paging indication may be transmitted on the same OFDM symbols as the RMSI PDCCH. The paging indication may be frequency multiplexed with the RMSI CORESET on these OFDM symbols. The same solution may be similarly applicable if the SCS of the SSB is 240 kHz and the SCS of the RMSI PDCCH/PDSCH is 120 kHz.

If the SCS of the SSB and the RMSI PDCCH/PDSCH are different, then the SCS of the paging indication channel may be determined to be the same as the SCS of the RMSI PDCCH/PDSCH. For example, if pattern 1 is used and the SCS of the SSB/RMSI is 15 kHz/30 kHz, the SCS of the paging indication may be 30 kHz. For example, if pattern 1 is used and the SCS of SSB/RMSI is 30 kHz/15 kHz, the SCS of the paging indication may be 15 kHz.

Figure 14:
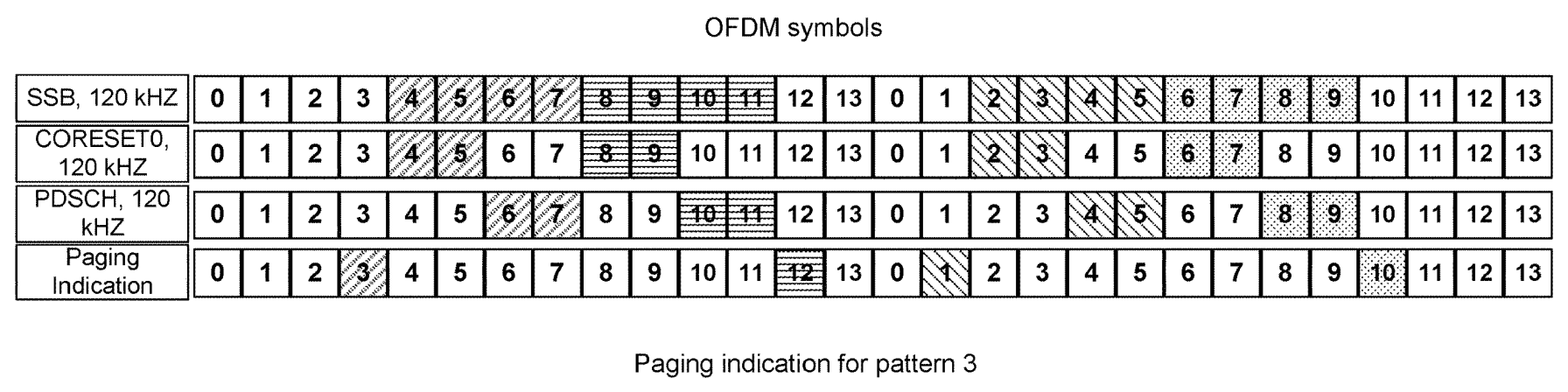

FIG. 14 shows an example of a paging indication multiplexing sample for pattern 3. The SCS of the paging indication may be determined to be the same as the SCS of the RMSI PDCCH/PDSCH and the SSB if the SSB and the RMSI have the same SCS, e.g., as in pattern 3 illustrated in FIG. 14. For example, if the SCS of the SSB and the RMSI are 120 kHz (e.g., are both 120 kHz), the SCS of the paging indication may be determined to be 120 kHz. As shown in pattern 3 in FIG. 14, the paging indication may be transmitted on the OFDM symbols that may not include any one of the associated SSB and RMSI PDCCH/PDSCH.

In examples, if the SCS of the SSB/RMSI is the same, then the SCS of the paging indication may be determined to be different than the SCS of the SSB/RMSI and may be determined as a function of the frequency band (e.g., FR1 or FR2). For example, the following cases may apply: For FR1: (i) SSB=15 kHz, RMSI=15 kHz, paging indication=30 kHz; (ii) SSB=30 kHz, RMSI=30 kHz, paging indication=15 kHz. For FR2: (i) SSB=60 kHz, RMSI=60 kHz, paging indication=120 kHz; (ii) SSB=120 kHz, RMSI=120 kHz, paging indication=60 kHz.

Figure 15:
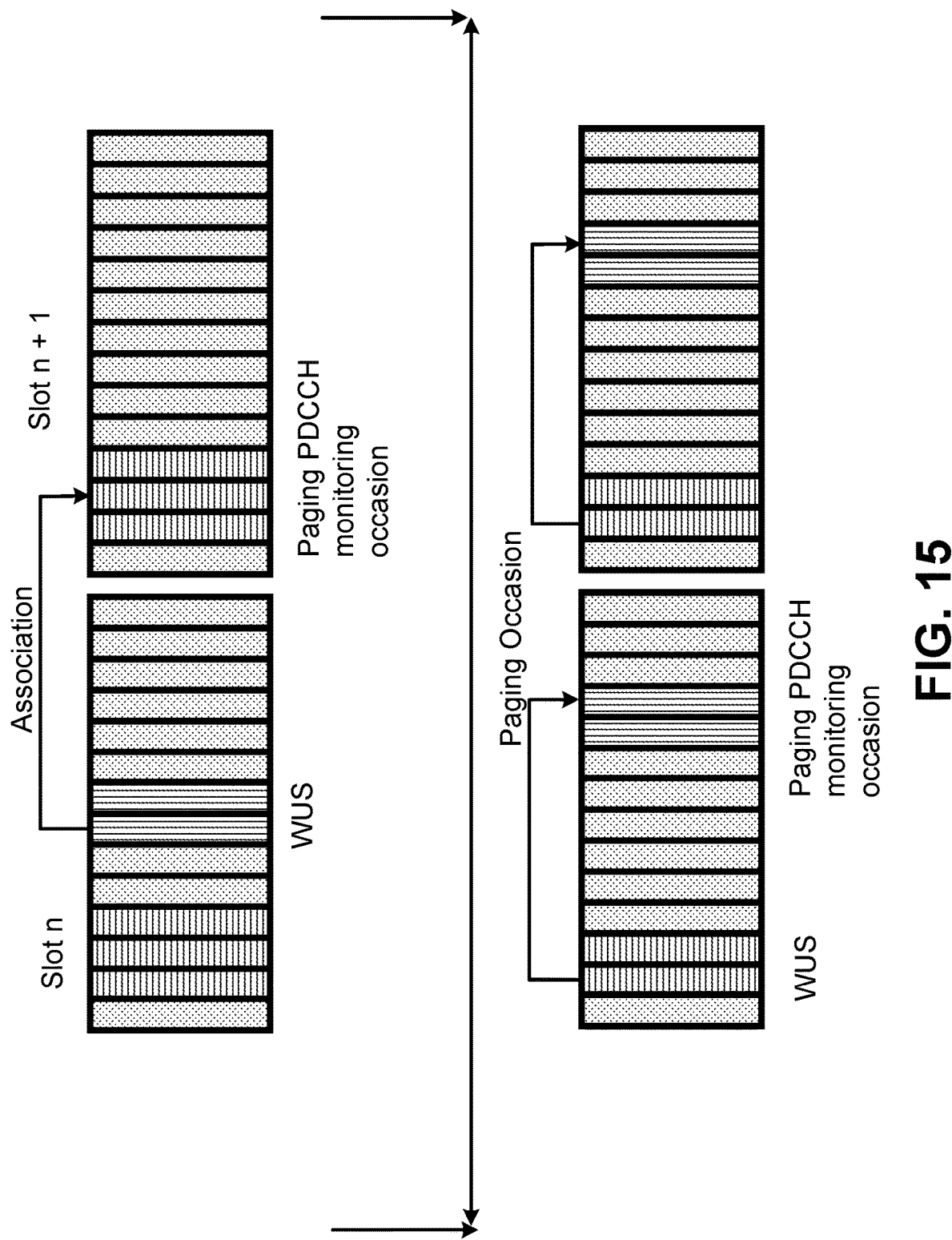
FIG. 15 illustrates an example of WUS and paging physical downlink control channel (PDCCH) multiplexing.

FIG. 15 is a diagram illustrating an example of WUS and paging PDCCH multiplexing. WUS multiplexing with paging PDCCH may be provided (e.g., supported). WUS blocks may be multiplexed with a paging PDCCH and/or a paging PDSCH. In examples, a WUS block monitoring occasion and an associated paging PDCCH monitoring occasion may be in the same slot or in multiple (e.g., two consecutive) slots (e.g., as shown by example in FIG. 15). The paging PDCCH and the associated WUS block may be associated with the same SS block.

A WUS block associated with the n'th paging PDCCH monitoring occasion may be monitored in one of the slots between the slots containing the n'th and (n−1)'th paging PDCCH monitoring occasions. The time location of the WUS block associated with the n'th paging PDCCH monitoring occasion may be configured. For example, the WUS block may be monitored in slot (n−1)+k, where k may be a configurable parameter.

The WUS time location and multiplexing pattern of WUS blocks may be determined by one or more of the following: WTRU capability, SSB pattern, paging PDCCH search space configuration, or subcarrier spacing. A WTRU may indicate to a gNB the time the WTRU is to wake-up from deep sleep in DRX mode and start monitoring the paging PDCCH. A WTRU may monitor or may be configured to monitor WUS blocks and paging PDCCH occasions in a multiplexed manner if the time gap between a WUS block monitoring occasion and the associated paging PDCCH monitoring occasion is sufficient for the WTRU to wake-up. In examples, a WTRU may (e.g., for certain subcarriers) monitor or may be configured to monitor the WUS blocks around the SS blocks (e.g., as shown by example in FIG. 12). A WTRU may (e.g., for other subcarriers) monitor or may be configured to monitor the WUS blocks before an SS burst.

A specific SSB/WUS multiplexing pattern or the multiplexing of the resources of the WUS monitoring occasions may be configured (e.g., by an gNB). A WTRU (e.g., one or more first WTRUs) may monitor or may be configured to monitor WUS blocks around SS blocks (e.g., as shown by example in FIG. 12) while another WTRU (e.g., one or more second WTRUs) may monitor or may be configured to monitor WUS blocks with a time offset to a SS burst (e.g., as shown by example in FIG. 11). A WTRU (e.g., one or more third WTRUs) may monitor or may be configured to monitor WUS blocks multiplexed with PDCCH monitoring occasions (e.g., as shown by example in FIG. 15).

A WUS time location and multiplexing pattern of WUS blocks may be configured (e.g., by a gNB) and may be determined by one or more of the following: a WTRU capability, an SSB pattern, a paging PDCCH search space configuration, subcarrier spacing, etc.

Figure 16:
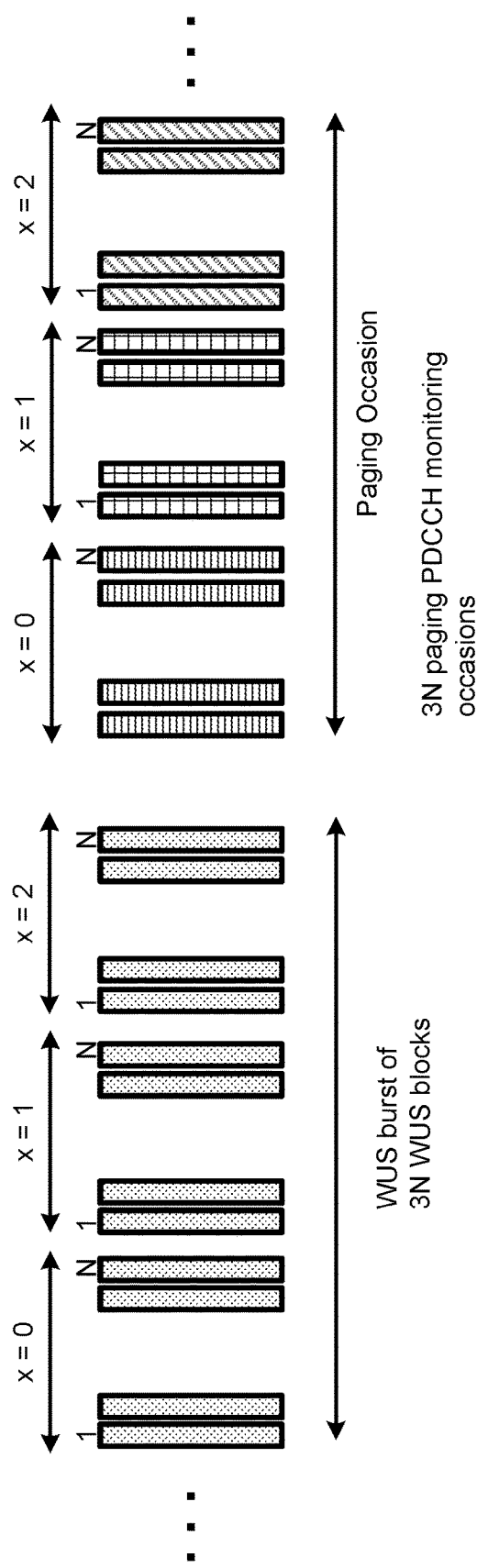
FIG. 16 illustrates an example of a WUS burst pattern.
Figure 17:
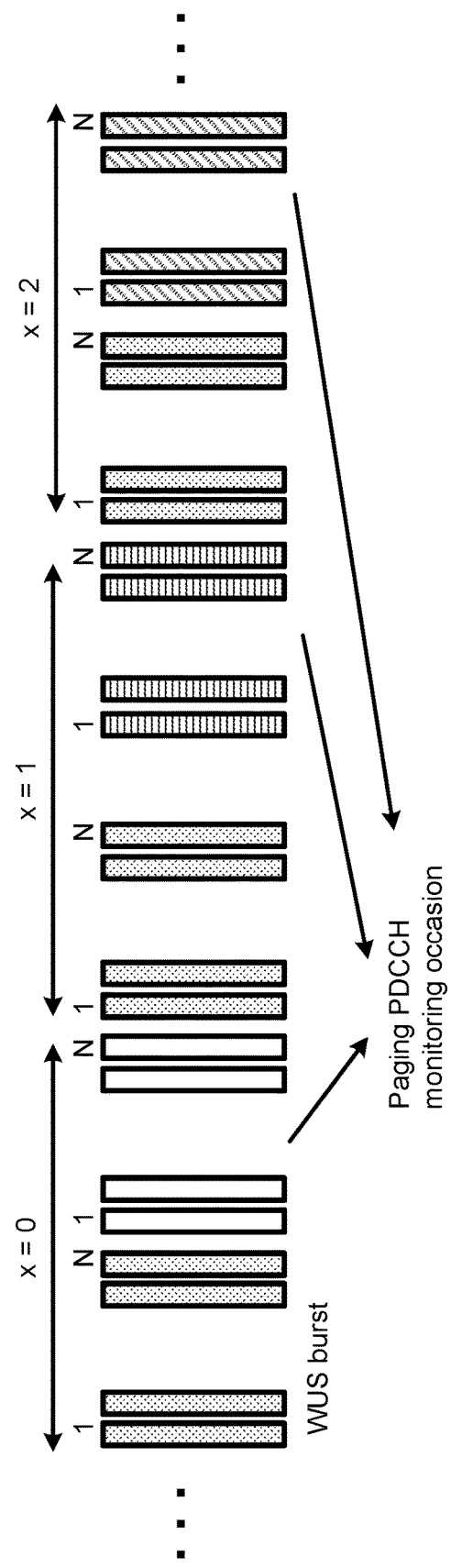
FIG. 17 illustrates an example of a WUS burst pattern.

Multiple WUS bursts may be monitored. FIGS. 16-17 show diagrams illustrating examples of WUS burst patterns. A WUS may be monitored in (X*N) WUS block monitoring occasions, where X may be an integer that is configurable (e.g., X=3), where N may be the number of WUS blocks in a WUS burst, and where a WUS block (e.g., each WUS block) may be associated with a corresponding SSB. X*N monitoring occasions for a paging PDCCH may follow the WUS monitoring occasions. Monitoring may be performed such that the WUS block (x*N+n), (x=0, 1, . . . X−1; n=1, 2, . . . N) may be associated with SS block n. A WTRU may monitor or may be configured to monitor (e.g., only monitor) a subset of associated paging PDCCH monitoring occasions if the WTRU monitors and detects a wake-up indication in the WUS. In examples, a WTRU may monitor (e.g., only monitor) the paging PDCCH monitoring occasions that correspond to x=0 (e.g., the first N occasions out of (X*N) maximum occasions).

In examples, a WTRU may monitor or may be configured to monitor (e.g., only monitor) N paging PDCCH monitoring occasions if the WTRU is configured with a WUS signal/channel. In examples, a WTRU may monitor or may be configured to monitor (X*N) paging PDCCH monitoring occasions if the WTRU is not configured with a WUS signal/channel.

A WUS burst and a corresponding set of N paging monitoring occasions may be multiplexed (e.g., as shown by example in FIG. 15), where N paging PDCCH monitoring occasions may follow N WUS monitoring occasions. A WTRU may monitor the WUS until the WTRU detects a wake-up indication. The WTRU may (e.g., may then) monitor the corresponding paging PDCCH monitoring occasions. For example, a WTRU may detect a wake-up indication in WUS burst three (e.g., corresponding to x=2). The WTRU may not monitor the paging PDCCH in the first two bursts. The WTRU may monitor the paging PDCCH in the occasions (e.g., only in the occasions) that correspond to x=2. The WTRU may monitor the paging PDCCH that is associated with the WUS block in which the wake-up indication is detected.

If (e.g., during cell search) a WTRU determines from a MIB that a CORESET for Type0-PDCCH CSS set is present, the WTRU may determine a number of consecutive RBs and a number of consecutive symbols for the CORESET of the Type0-PDCCH CSS set, e.g., from controlResourceSetZero in pdcch-ConfigSIB1. The WTRU may determine PDCCH monitoring occasions, e.g., from searchSpaceZero in pdcch-ConfigSIB1, which may be included in MIB.

A WTRU may have reduced capability. For example the maximum bandwidth the WTRU supports may be less than the maximum bandwidth supported in the system. The bandwidth a WTRU supports may be smaller than the bandwidth used by an aspect of the system. An aspect of the system may, for example, include one or more of: a BWP such as a DL BWP or UL BWP, an initial BWP, a default BWP, the number of RBs needed or used for a CORESET, or the number of RBs needed or used for a CORESET 0, e.g., the CORSET 0 for or used by non-reduced capability WTRUs. A system aspect or a property of a system aspect (e.g., number of RBs, RB location, time location, RB pattern, time pattern, SCS, among others) may be indicated in a MIB. A WTRU with a reduced capability may be referred to as a reduced capability WTRU. A WTRU may be in a coverage enhancement mode, which may include the WTRU supporting transmission scheme(s) for enhancing coverage. A WTRU may be a reduced capability WTRU and/or a coverage enhanced WTRU. A WTRU that is a reduced capability WTRU and/or a coverage enhanced WTRU may be referred to as a RC/CE WTRU.

A CORESET (e.g., CORESET 0 or the CORESET of the Type0-PDCCH CSS and/or the Search Space Zero (SS0)) for RC/CE WTRUs may be different than other types of WTRUs (e.g., non RC/CE WTRUs). One or more of a first CORESET 0, a first SS0, and/or a first Type0-PDCCH CSS may be intended for or used by a first set of WTRUs (e.g., regular or non-R/C WTRUs) and one or more of a second CORESET 0, a second SS0, and/or a second Type0-PDCCH CSS may be intended for or used by a second set of WTRUs (e.g., RC/CE WTRUs). In examples, RC-CORESET 0, RC-SS0, and RC-Type0-PDCCH CSS may be used herein when referring to the second CORESET 0, the second SS0, and the second Type0-PDCCH CSS, respectively. Other names may be used including the names of the first CORESET 0, SS0, Type0-PDCCH CSS and still be consistent with examples described herein.

In examples, the bandwidth (e.g., maximum bandwidth) of an RC-CORESET0 may be smaller than the bandwidth (e.g., maximum bandwidth) of a CORESET0. RC/CE WTRU(s) may monitor or may be configured to monitor repetitions of the PDCCH. The repetition pattern may be included in the configuration indicated in a MIB (e.g., in a SS0 configuration).

A WTRU (e.g., such as an RC/CE WTRU) may determine to use a RC-CORESET0 and/or RC-SS0. The WTRU may obtain one or more monitoring parameters for the RC-CORESET0 and/or RC-SS0 and/or RC-Type0-PDCCH CSS from a MIB (e.g., a regular MIB or a different MIB), from the contents of the pdcch-ConfigSIB1 or another parameter or field indicated by the MIB. The MIB may include an indication that enables a WTRU to determine how and/or when to monitor and/or receive a PDCCH, e.g., such as a PDCCH in RC-Type0-PDCCH CSS, using RC-CORESET0, using RC-SS0, among others. The indication may provide an index (e.g., to table) or other indication from which the WTRU may obtain one or more monitoring parameters such as time and frequency information. The indication may be the same indication used by another WTRU (e.g., a non-RC/CE WTRU) to determine one or more monitoring parameters for PDCCH using CORESET0 and/or SS0 and/or Type0-PDCCH CSS. Two different tables or configurations may be used and one WTRU may use one table or configuration and another WTRU may use the other table based on the type or one or more capabilities of the WTRU. The same index may correspond to different configurations in the two tables. One WTRU may obtain the index or indication from one MIB (e.g., a regular MIB) and another WTRU may obtain the index or indication from another MIB (e.g., a RC-MIB, where the another WTRU may be a RC WTRU).

An RC/CE WTRU may use the same PSS and/or SSS that is used by a non-RC/CE WTRU. The RC/CE WTRU may read a first MIB (e.g., the regular MIB). The first (e.g., regular) MIB may indicate the location of a second MIB (e.g., RC-MIB) that may be read by the RC/CE WTRU. An RC/CE WTRU may read the second MIB directly without indication from the first (e.g., regular) MIB. An index or indication in the first MIB may be interpreted by some WTRUs for a first purpose and may be interpreted by some other WTRUs for a second purpose. For example, a non RC/CE WTRU may use the index or indication to obtain one or more monitoring parameters for PDCCH using CORESET0 and/or SS0 and/or Type0-PDCCH CSS. The index or indication may be used by an RC/CE WTRU to determine the location in time and/or frequency of the second MIB. The RC/CE WTRU may use an indication in the second MIB to obtain one or more monitoring parameters for PDCCH using RC-CORESET0 and/or RC-SS0 and/or RC-Type0-PDCCH CSS. The second MIB may be referred to as RC-MIB. The PBCH channel that may be used to carry the RC-MIB may be referred to herein as RC-PBCH or RC/CE PBCH. The RC/CE WTRU may determine one or more parameters from an RC-MIB that a non RC/CE may obtain from the MIB.

MIB and PBCH may be used interchangeably herein. A MIB may be received by a WTRU on a PBCH. RC-MIB and RC-PBCH may be used interchangeably herein. An RC-MIB may be received by a WTRU on a RC-PBCH.

An RC/CE WTRU may determine one or more indices from the MIB (e.g., from bits corresponding to pdcch-ConfigSIB1). For example, one index may be used for RC-CORESET0 configuration and/or one for RC-SS0 configuration, and use one or more tables to map the indices to specific configuration parameters. A separate set of tables may be defined for each index. A non-RC/CE WTRU may use the same bits to generate the same indices but may map the indices to a different set of tables. An RC/CE WTRU may read the indices from an RC-MIB and a non-RC/CE WTRU may read the indices from the MIB. The indices may have the same or a different number of bits in the first and second MIBs.

Figure 18:
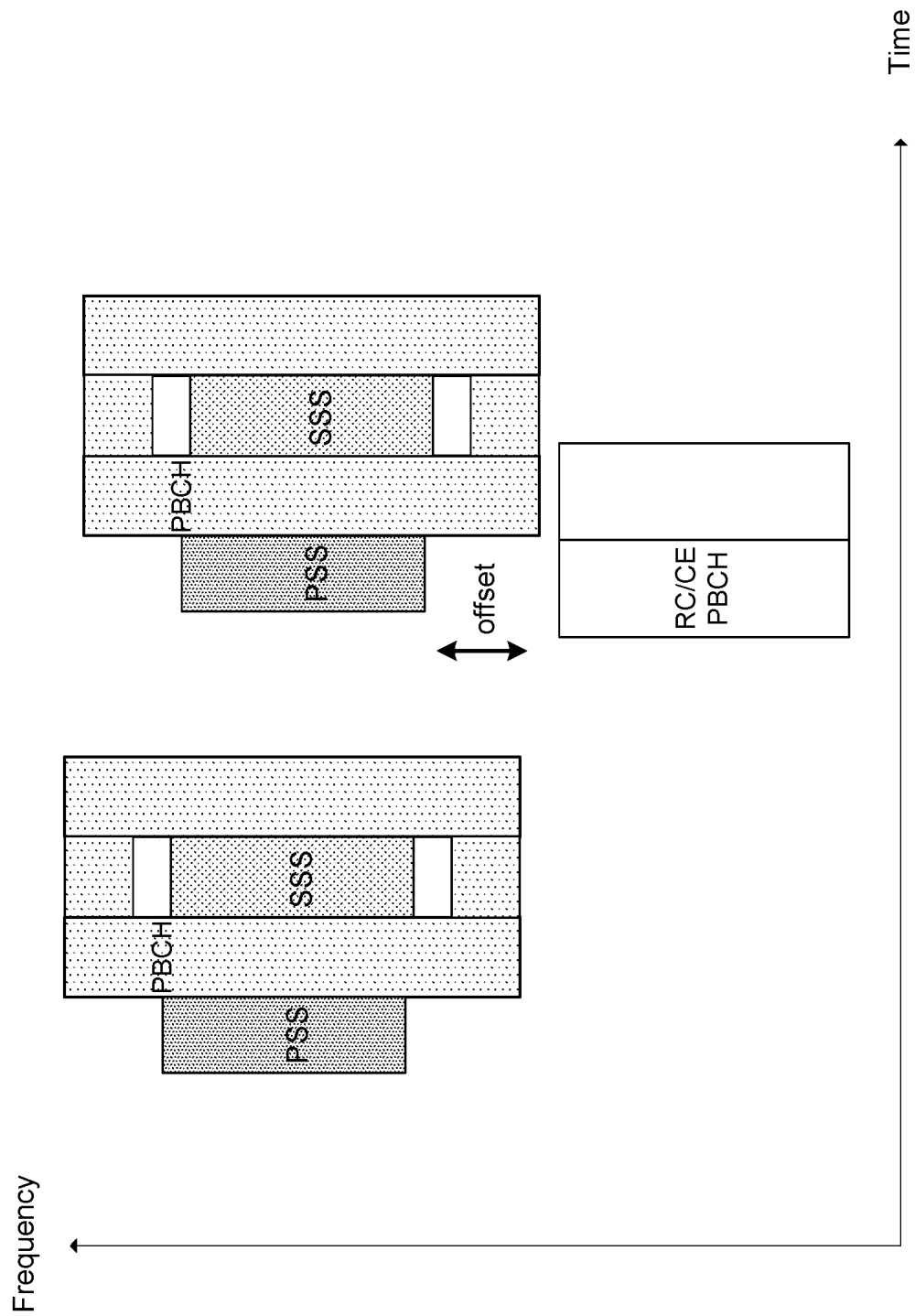
FIG. 18 illustrates an example where an RC/control element (CE) PBCH is offset in frequency.

FIG. 18 illustrates an example where an RC/CE PBCH is offset in frequency. An SS block (e.g., in NR) may include a PSS, SSS and PBCH as shown in FIG. 18, where the x axis denotes time and y axis frequency. An RC/CE WTRU may monitor or may be configured to monitor the RC/CE PBCH in a time and/or frequency location that may be different than the time and/or frequency location of the PBCH that may be monitored by the non RC/CE WTRUs. The RC/CE PBCH may be monitored in a frequency location that is an offset from the PSS where the reference point may be one of the subcarriers and/or RBs of the PSS. The RC/CE PBCH may be monitored in one or more of the OFDM symbols carrying the PSS/SSS/PBCH. The WTRU may assume that the RC/CE PBCH is associated with QCL-TypeD to the SS block of these OFDM symbols. The RC/CE PBCH may be monitored in one or more of the OFDM symbols not carrying the PSS/SSS/PBCH and each RC/CE PBCH may be assumed to be associated to a SS block. An RC/CE WTRU may first use the SS block to achieve synchronization (e.g., using the PSS and SSS). The RC/CE WTRU may (e.g., may then) receive the RC/CE PBCH.

Although features and elements described above are described in particular combinations, each feature or element may be used alone without the other features and elements of the preferred examples, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU), comprising:
   a memory; and a processor configured to:
   determine a time window associated with monitoring for one or more group-specific paging indicators, the time window occurring prior to a paging occasion for the WTRU;
   monitor for the one or more group-specific paging indicators during the time window, wherein the WTRU determines that it has received the one or more group-specific paging indicators for a group including the WTRU based on a received group-specific paging indicator being associated with one or more of a cyclic shift or a scrambling sequence that is based on an identifier associated with the group;
   monitor for physical downlink control channel (PDCCH) transmissions comprising paging information during the paging occasion for the WTRU on condition that the WTRU determines that it has received the one or more group-specific paging indicators and that the one or more group-specific paging indicators are associated with the cyclic shift or the scrambling sequence that is based on the identifier associated with the group; and receive one or more cell-specific paging indicators, wherein the one or more cell-specific paging indicators indicate that a system information update is to be performed using one or more of a second cyclic shift or a second scrambling sequence, the one or more of the second cyclic shift or the second scrambling sequence associated with the one or more group-specific paging indicators.

2. The WTRU of claim 1, wherein the processor is further configured to cease monitoring for PDCCH transmissions on condition that the WTRU determines that it has not received the one or more group-specific paging indicators.

3. The WTRU of claim 1, wherein the one or more group-specific paging indicator comprise configuration information including one or more of a time/frequency resource, beam related information, a type of paging indication, an associated paging occasion (PO) or a paging radio network temporary identifier (P-RNTI), timing information with respect to an associated PO and PDCCH monitoring occasion, and a repetition number.

4. The WTRU of claim 1, wherein the processor is further configured to monitor a subset of one or more paging indicators.

5. The WTRU of claim 4, wherein the processor is configured to monitor the subset of paging indicators based on one or more signal quality measurements.

6. The WTRU of claim 1, wherein the scrambling sequence is generated based on a WTRU group identity.

7. The WTRU of claim 1, wherein the scrambling sequence comprises a pseudo random sequence, the pseudo random sequence initialized based on one or more parameters.

8. A method implemented by a wireless transmit/receive unit (WTRU), the method comprising:

determining a time window associated with monitoring for one or more group-specific paging indicators, the time window occurring prior to a paging occasion for the WTRU;

monitoring for the one or more group-specific paging indicators during the time window, determining that the WTRU has received the one or more group-specific paging indicators for a group including the WTRU based on a received group-specific paging indicator being associated with one or more of a cyclic shift or a scrambling sequence that is based on an identifier associated with the group;

monitoring for physical downlink control channel (PDCCH) transmissions comprising paging information during the paging occasion for the WTRU on condition that the WTRU determines that it has received the one or more group-specific paging indicators and that the one or more group-specific paging indicators are associated with the cyclic shift or the scrambling sequence that is based on the identifier associated with the group; and receiving one or more cell-specific paging indicators, wherein the one or more cell-specific paging indicators indicate that a system information update is to be performed using one or more of a second cyclic shift or a second scrambling sequence, the one or more of the second cyclic shift or the second scrambling sequence associated with the one or more group-specific paging indicator.

9. The method of claim 8, further comprising ceasing monitoring for PDCCH transmissions on condition that the WTRU determines that it has not received the one or more group-specific paging indicators.

10. The method of claim 8, wherein the one or more group-specific paging indicator comprise configuration information including one or more of a time/frequency resource, beam related information, a type of paging indication, an associated paging occasion (PO) or a paging radio network temporary identifier (P-RNTI), timing information with respect to an associated PO and/or PDCCH monitoring occasion, and a repetition number.

11. The method of claim 8, further comprising monitoring a subset of one or more paging indicators.

12. The method of claim 11, further comprising monitoring the subset of paging indicators based on one or more signal quality measurements.

13. The method of claim 8, wherein the scrambling sequence comprises a pseudo random sequence, the pseudo random sequence initialized based on one or more parameters.

* * * * *